(12) United States Patent
Sakurai et al.

(10) Patent No.: US 7,607,783 B2
(45) Date of Patent: Oct. 27, 2009

(54) IMAGING APPARATUS, IMAGE PROCESSING APPARATUS, IMAGE PROCESSING METHOD OF IMAGING APPARATUS AND COMPUTER PROGRAM

(75) Inventors: Keiichi Sakurai, Akishima (JP); Akihiko Nagasaka, Musashimurayama (JP); Tetsuji Makino, Ome (JP); Yoshihiro Teshima, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 713 days.

(21) Appl. No.: 10/964,538

(22) Filed: Oct. 13, 2004

(65) Prior Publication Data

US 2005/0078879 A1    Apr. 14, 2005

(30) Foreign Application Priority Data

Oct. 14, 2003    (JP)    ............... 2003-354398

(51) Int. Cl.
    *G03B 21/14*    (2006.01)
    *G06K 9/40*    (2006.01)
    *H04N 3/23*    (2006.01)
    *H04N 3/223*    (2006.01)
    *H04N 3/227*    (2006.01)

(52) U.S. Cl. ............... 353/70; 353/69; 382/275; 348/746; 348/747

(58) Field of Classification Search ............... 353/69, 353/70; 382/275; 348/746–747
See application file for complete search history.

(56) References Cited

U.S. PATENT DOCUMENTS

| | | | |
|---|---|---|---|
| 6,304,298 B1 * | 10/2001 | Steinberg et al. | 348/587 |
| 6,721,465 B1 * | 4/2004 | Nakashima et al. | 382/318 |
| 2002/0054217 A1 * | 5/2002 | Matsuda et al. | 348/218 |
| 2002/0060743 A1 * | 5/2002 | Hori et al. | 348/280 |
| 2005/0168705 A1 * | 8/2005 | Li et al. | 353/69 |
| 2006/0239537 A1 * | 10/2006 | Shragai et al. | 382/154 |

FOREIGN PATENT DOCUMENTS

| | | |
|---|---|---|
| CN | 1196151 A | 10/1998 |
| CN | 1307714 A | 8/2001 |
| JP | 05-101221 A | 4/1993 |

(Continued)

OTHER PUBLICATIONS

Chinese Office Action (and English translation thereof) dated Apr. 4, 2008, issued in a counterpart Chinese Application.

(Continued)

*Primary Examiner*—Diane I Lee
*Assistant Examiner*—Magda Cruz
(74) *Attorney, Agent, or Firm*—Frishauf, Holtz, Goodman & Chick, P.C.

(57) ABSTRACT

A document camera has an image processing apparatus, which acquires the contour of an image of an original by means of a Roberts filter. The image processing apparatus detects straight lines as candidates for forming an image of the original from the acquired contour and acquires the shape of a quadrangle of the original. The image processing apparatus determines the projection parameters showing the relationship between the shape of the image of the original and the shape of the actual original from the positions of the corners of the quadrangle and executes an operation of projection/transformation on the image of the original. The document camera outputs the image data of the image to a projector, which projects an image of the original on a screen according to the image data.

12 Claims, 35 Drawing Sheets

FOREIGN PATENT DOCUMENTS

| | | |
|---|---|---|
| JP | 05-266161 A | 10/1993 |
| JP | 06-274649 A | 9/1994 |
| JP | 08-111778 A | 4/1996 |
| JP | 2002-354331 A | 12/2002 |
| JP | 2003-015218 A | 1/2003 |
| JP | 2003-078725 A | 3/2003 |
| JP | 2003-141520 A | 5/2003 |
| JP | 2003-250056 A | 9/2003 |
| JP | 2003-283916 A | 10/2003 |
| JP | 2003-288588 A | 10/2003 |

OTHER PUBLICATIONS

Japanese Office Action dated Jul. 29, 2008 (and English translation thereof) issued in counterpart Japanese Patent Application 2003-354398.

* cited by examiner

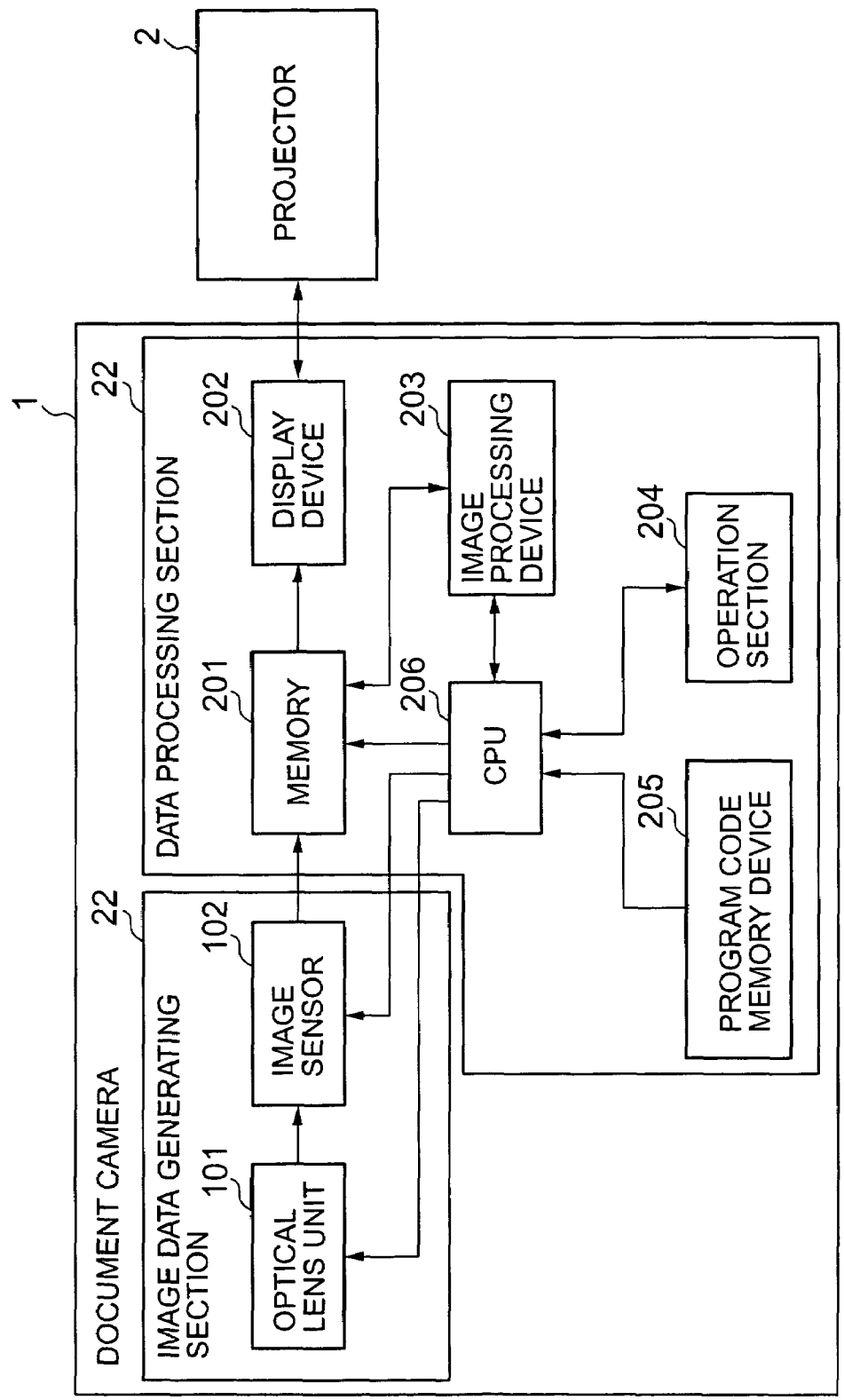

REDUCED LUMINANCE IMAGE

EDGE IMAGE

FIG. 11A
Δ1
| 1 | 0 |
|---|---|
| 0 | -1 |
FIG. 11B
Δ2
| 0 | 1 |
|---|---|
| -1 | 0 |
FIG. 12A
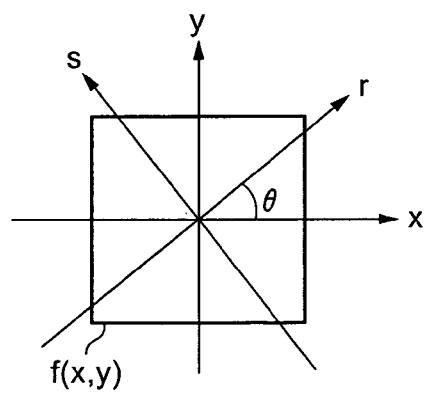
FIG. 12B
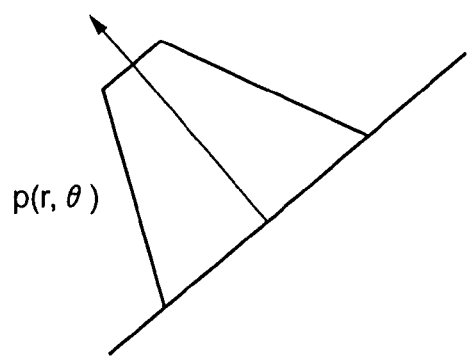

$d\theta 1 = \theta 11 - \theta 12$
$d\theta 2 = \theta 21 - \theta 22$

NUMBER OF STRAIGHT LINE COORDINATES
$N1 = 4$

IMAGING APPARATUS, IMAGE PROCESSING APPARATUS, IMAGE PROCESSING METHOD OF IMAGING APPARATUS AND COMPUTER PROGRAM

BACKGROUND OF THE INVENTION

1. Field of the Invention

This invention relates to an imaging apparatus, an image processing apparatus, an imaging method of an image processing apparatus and an image processing computer program.

2. Description of the Related Art

As a result of technological development in the field of digital camera, conventional OHPs (OverHead Projectors) for reading papers and OHP sheets by means of a line scanner and projecting images thereof have been and being replaced by those using a text/picture (document) camera that comprises a digital camera.

A document camera is adapted to pickup an image of the original placed on an original table by the user by means of a camera and the data of the original obtained by picking up the image of the original are stored in the memory of a computer and processed so that the original is enlarged and projected on a screen by means of a projector (see, inter alia, Patent Document 1: Unexamined Japanese Patent Application KOKAI Publication No. 2002-354331 (pp. 2-3, FIG. 1)).

Unlike conventional OHPs, such document cameras can pick up an image of a three-dimensional object and project an image thereof. Thus, they are replacing the conventional OHPs.

However, when the original is shot by a known document camera from an oblique direction, the edge of the original located close to the camera goes out of the view angle (shooting range) of the camera. The zoom magnification of the camera has to be reduced to avoid this problem.

Then, as a result the ratio of the area of the original to the total area of the picked-up image is reduced even if the image is subjected to keystone correction so that only a small image of the original is projected and the viewers will find difficulty in viewing the projected image. This tendency becomes remarkable particularly when the angle of camera movements is large.

Additionally, if the original is warped or distorted, the picked-up image may contain an unnecessary part. Then, if the image containing such an unnecessary part is processed for luminance, color difference and so on to improve the effects of the image, the image can be improperly processed and, if such an image is projected on a screen, again the viewers will find difficulty in viewing the projected image.

In view of the above identified problems of the prior art it is therefore the object of the present invention to provide an imaging apparatus, an image processing apparatus, an image processing method of an imaging apparatus and an image processing computer program capable of obtaining a clearly visible image.

SUMMARY OF THE INVENTION

In the present invention, the above object is achieved by providing an imaging apparatus for shooting an original, the apparatus including a shape acquiring unit which acquires: (i) an image of the original that is obtained by shooting the original, (ii) a contour of the image of the original that is of an image representing the original within a shot image, and (iii) a shape of the image of the original based on the acquired contour; a correction parameter acquiring unit which acquires image effect correction parameters for correcting an image effect based on only an area of the image of the original whose shape is acquired by the shape acquiring unit; and an image effect processing unit which performs an image effect process for the image of the original by using the image effect correction parameters acquired by the correction parameter acquiring unit.

In addition, in the present invention, the correction parameter acquiring unit comprises a projection parameter acquiring unit which determines projection parameters indicating a relationship between the shape of the image of the original and an actual shape of the original based on the shape of the image of the original acquired by the shape acquiring unit. The correction parameter acquiring unit acquires the actual shape of the original from a projected transformed image that is obtained by projection/transformation using the projection parameters determined by the projection parameter acquiring unit and acquires the image effect correction parameters based on the image of the original having the actual shape of the image thus acquired. And the shape acquiring unit cuts out the image of the original at a specified timing subsequent to acquiring the shape of the image of the original.

Thus, according to the invention, it is possible to acquire an image that is easy to see.

BRIEF DESCRIPTION OF THE DRAWINGS

These objects and other objects and advantages of the present invention will become more apparent upon reading of the following detailed description and the accompanying drawings in which:

FIG. 2 is a schematic block diagram of the document camera in FIG. 1, illustrating the configuration thereof;

FIGS. 11A and 11B are schematic illustrations of the function of a Roberts filter;

FIGS. 12A and 12B are schematic illustrations of Radon transformation;

FIG. 24A is a schematic illustration of the image effect process to be executed when the background color is white and FIG. 24B is a schematic illustration of the image effect process to be executed when the background color is black, whereas

DETAILED DESCRIPTION OF THE PREFERRED EMBODIMENTS

Now, the present invention will be described by referring to the accompanying drawings that illustrate preferred embodiments of the invention, which are imaging apparatuses.

The embodiments that are described below are imaging/image projecting apparatuses adapted to project an image that corresponds to the image of an original obtained by shooting the original.

Embodiment 1

Figure 1:
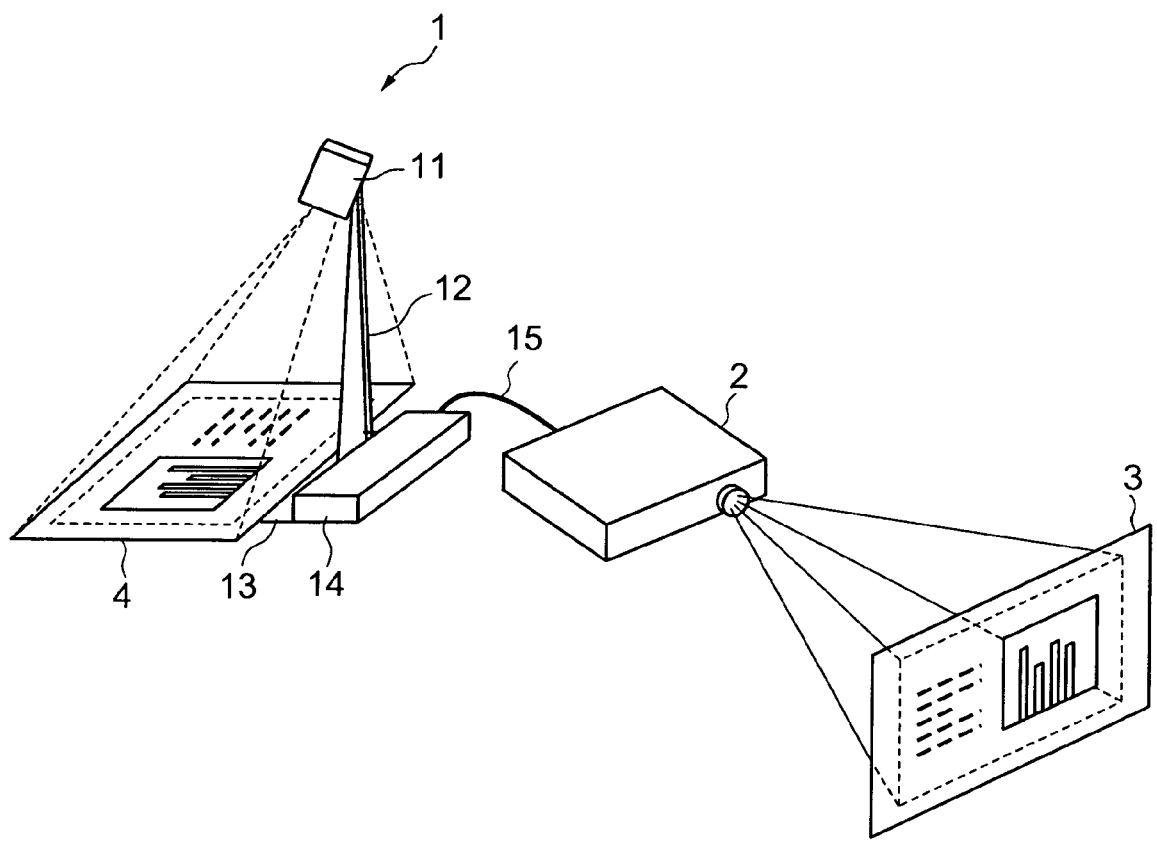
FIG. 1 is a schematic diagram of Embodiment 1 of the present invention, which is an imaging/image projection apparatus.

FIG. 1 is a schematic diagram of Embodiment 1 of the present invention, which is an imaging/image projection apparatus.

The imaging/image projection apparatus comprises a document camera 1 and a projector 2.

The text/picture (document) camera 1 is a camera system for shooting an object of projection, which is an original 4 and has a camera section 11, a pillar 12, a base seat 13 and an operation table 14. The camera section 11 operates to pick up an image of the original 4. A digital camera is used for the camera section 11. The camera section 11 is mounted on the pillar 12. The base seat 13 supports the pillar 12.

As shown in FIG. 2, the document camera 1 has an image data generating unit 21 and a data processing unit 22. The image data generating unit 21 operates for shooting the original 4 and taking in the image data of the original 4.

The data processing unit 22 receives the image data taken in by the image data generating unit 21 from the latter and processes them so as to output the processed image data to the projector 2.

The image data generating unit 21 and the data processing unit 22 may be arranged in the camera section 11 shown in FIG. 1 or alternatively they may be arranged respectively in the camera section 11 and the operation table 14.

The image data generating unit 21 includes an optical lens section 101 and an image sensor 102.

The optical lens section 101 includes condenser lens and other lenses for the purpose of picking up an image of the original 4.

The image sensor 102 is adapted to take in the image data obtained by digitizing the image formed by the optical lens section 101 that converges beams of light. It includes a CCD (Charge Coupled Device) and other components.

The data processing unit 22 has a memory 201, a display device 202, an image processing apparatus 203, an operation unit 204, a program code memory device 205 and a CPU (Central Processing Unit) 206.

The memory 201 temporarily stores the image from the image sensor 102 and the image data to be transmitted to the display device 202.

The display device 202 displays the image to be transmitted to the projector 2.

The image processing apparatus 203 performs image processes on the image data temporarily stored in the memory 201 for the purpose of correcting the distortion of the image and processing the image effect.

Figure 3A:
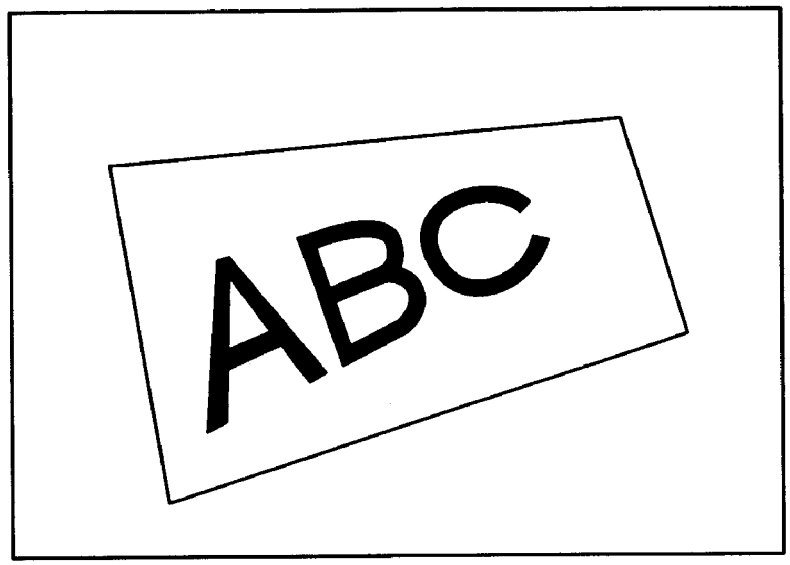
FIGS. 3A and 3B are schematic illustrations of the function of the image processing apparatus in FIG. 2.
Figure 3B:
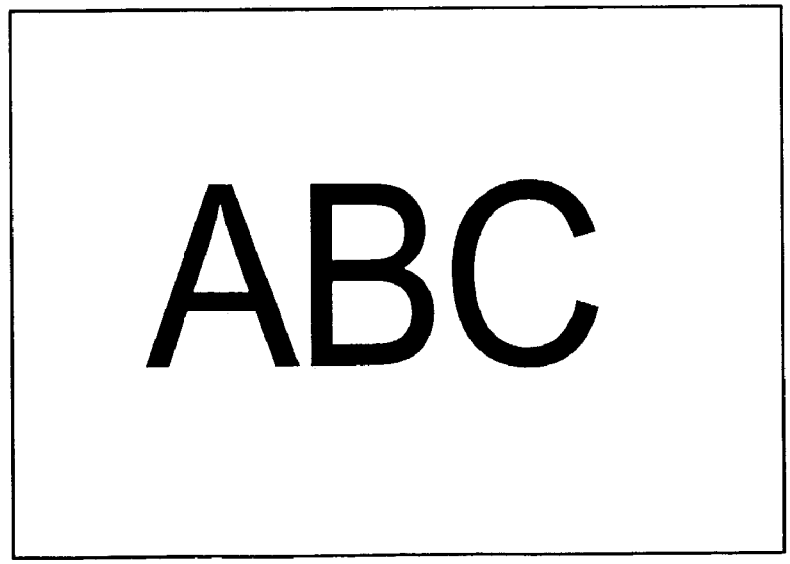

The image processing apparatus 203 generates an image of the original 4 same as an image picked up from the right front of the original 4 as shown in FIG. 3B by correcting the distortion (keystone correction) of the image of the original 4 picked up from an angle that is inclined or rotated relative to the imaging plane of the camera section 11 as shown in FIG. 3A.

The image processing apparatus 203 cuts out a quadrangle from the distorted image of the original 4 and performs an operation of inverse transformation by projection/transformation of the image of the original 4 using the quadrangle in order to correct the distortion of the image.

More specifically, the image processing apparatus 203 performs the following operations under the control of the CPU 206.

(1) Extraction of affine parameters from the image of the original 4
(2) Image transformation using the extracted affine parameters
(3) Extraction of image effect correction parameters relating to luminance or color difference and image effect processing
(4) Regulation of image transformation These operations will be described in greater detail hereinafter.

The operation unit 204 includes switches and keys for controlling the document projecting operation. As the user operates any of the keys and the switches, the operation unit 204 transmits information on the operation to the CPU 206.

Figure 4:
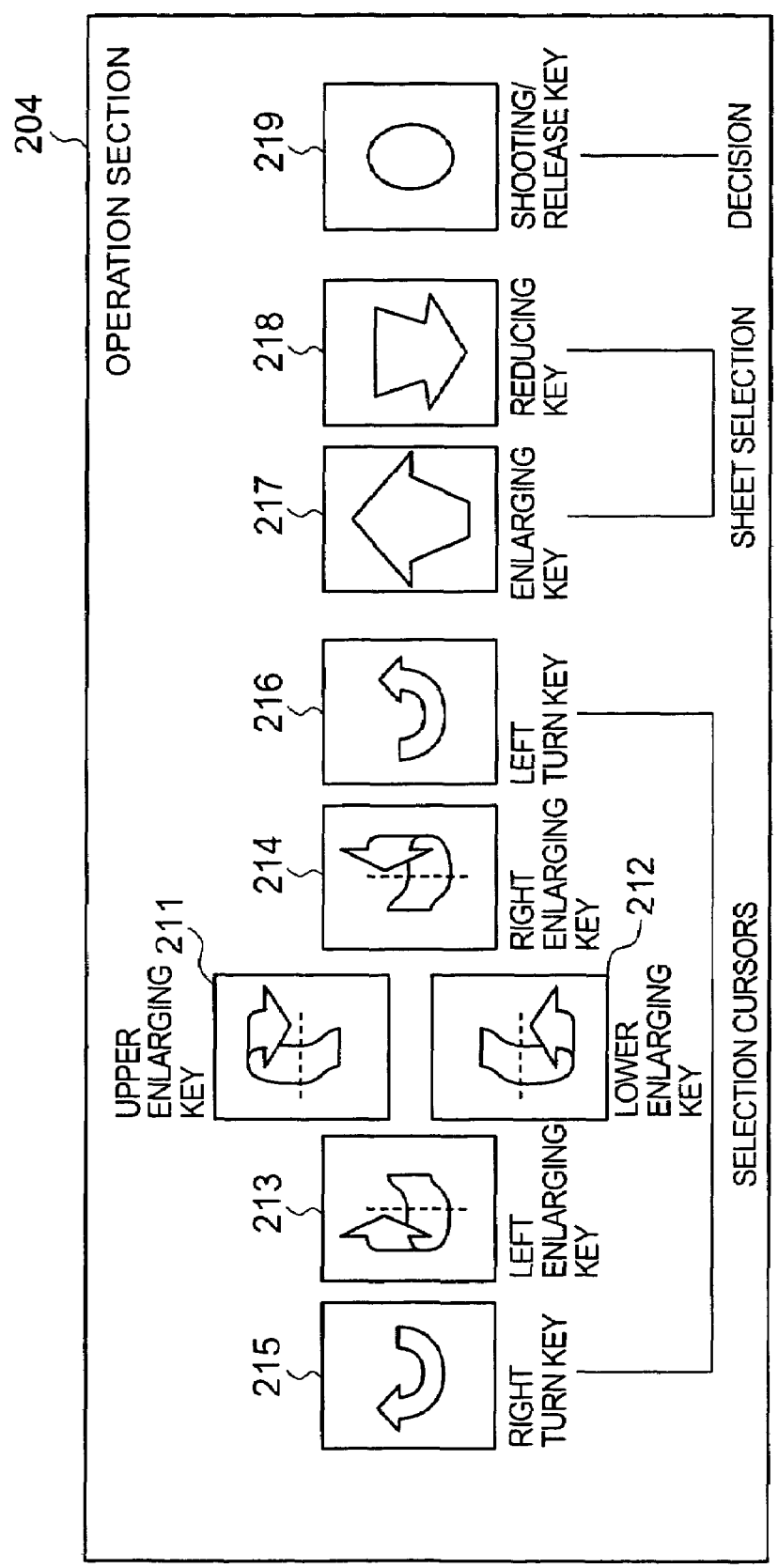
FIG. 4 is a schematic illustration of the keys of the operation unit in FIG. 2.

As shown in FIG. 4, the operation unit 204 has image regulation keys including a upper enlarging key 211, a lower enlarging key 212, a left enlarging key 213, a right enlarging key 214, a right rotation key 215, a left rotation key 216, an enlarging key 217, a reducing key 218 and a shooting/release key 219.

The upper enlarging key 211, the lower enlarging key 212, the left enlarging key 213 and the right enlarging key 214 are projection/transformation keys to be used for projection/transformation.

The upper enlarging key 211 is used to rotate the upper half of the image around a horizontal line passing through the center of the image toward the viewer who compares the upper half and the lower half of the image. The lower enlarging key 212 is used to rotate the lower half of the image toward the viewer around the horizontal line.

The left enlarging key 213 and the right enlarging key 214 are used to regulate the distortion of the left half and that of the right half of the image respectively by rotating the image around a vertical line passing through the center of the image. The left enlarging key 213 is operated when the left half of the image is small, whereas the right enlarging key 214 is operated when the right half of the image is small.

The right rotation key 215 and the left rotation key 216 are rotation correction keys for regulating the rotation of the image. The right rotation key 215 is used to rotate the image clockwise, whereas the left rotation key 216 is used to rotate the image counterclockwise.

The enlarging key 217 and the reducing key 218 are keys for transforming the image. The enlarging key 217 is used to enlarge the image, whereas the reducing key 218 is used to reduce the image.

The memory 201 stores the predetermined ratio for enlargement and reduction. If 2 is selected for the ratio, the image processing apparatus 203 doubles the size of the image when the user depresses the enlarging key 217 once. When the user depresses the enlarging key 217 for another time, the operation unit 204 and the CPU 206 control the image processing apparatus 203 to further double the size of the image in response to the key depression so that consequently the size of the image is quadrupled from that of the original image. When the reducing key 218 is depressed, the size of the enlarged image is reduced to a half. The operation unit 204 and the CPU 206 control the image processing apparatus 203 to reduce the enlarged image.

The upper enlarging key 211, the lower enlarging key 212, the left enlarging key 213 and the right enlarging key 214 operate as cursor keys when the enlarging key 217 is operated. More specifically, the upper enlarging key 211 functions as upward moving key for moving the image of the original 4 being displayed on the display device 202 upward when the enlarging key 217 is operated. Similarly, the lower enlarging key 212 functions as downward moving key for moving the image of the original 4 being displayed on the display device 202 downward when the enlarging key 217 is operated and the left enlarging key 213 functions as leftward moving key for moving the image of the original 4 being displayed on the display device 202 leftward when the enlarging key 217 is operated, whereas the right enlarging key 214 functions as rightward moving key for moving the image of the original 4 being displayed on the display device 202 rightward when the enlarging key 217 is operated.

The shooting/release key 219 is the key that is operated when shooting the original 4.

The program code memory device 205 operates to store the program that the CPU 206 executes. Typically, it comprises a ROM (Read Only Memory).

The CPU 206 controls the various components according to the program stored in the program code memory device 205. The memory 201 operates also as working memory for the CPU 206.

The CPU 206 determines if the image of the original 4, which is the shooting target (hereinafter referred to as shooting target), is moving or not and switches the imaging mode according to a flowchart, which will be described in greater detail hereinafter.

The imaging mode includes a movie mode and a still mode. The movie mode is selected at the time when the user places the original 4, whose image he or she wants to project on the base seat 13. Then, the image picked up by the camera section 11 is projected by the projector 2.

In the movie mode, the CPU 206 controls the related components so as to project a moving image with a resolution of VGA (Video Graphics Array) (640×480 dots) at a rate of 30 fps (frames per second). Thus, the movie mode is a mode where real time has high priority but resolution has low priority.

The still mode is selected after the user places the original 4. In the still mode, the camera section 11 shoots the original 4 to obtain a high resolution image so as to project a high resolution still image. If the camera section 11 has about 3 million pixels, the still image cut out for projection shows a resolution of XGA (eXtended Graphics Array) (1,024×768).

The CPU 206 determines if the image of the original 4 is moving or not in order to select either the movie mode or the still mode. To do this, the CPU 206 firstly determines the quantity of image change MD that is found between the image obtained last time and the current image. The quantity of image change MD is the quantity that represents the extent of change that is found between the image obtained last time and the image of the original that is currently being shot. Several methods may be conceivable for the purpose of computing such a quantity. For example, the CPU 206 may determine the total sum of the absolute values of the differences of all the pixels from the data of the image obtained by the last shooting operation and the data of the image obtained by the current shooting operation as the quantity of image change MD.

More specifically, if the image data obtained by the last shooting operation is Pn−1 (x,y) and the image data obtained by the current shooting operation is Pn(x,y), where 1≦x≦640 and 1≦y≦480, the quantity of image change MD is expressed by an equation 1 shown below.

$$MD = \sum_{x=1}^{640} \sum_{y=1}^{480} |P_n(x, y) - P_{n-1}(x, y)| \quad \text{Equation 1}$$

However, the total sum of the absolute values of the differences of all the pixels requires a vast volume of computation. Therefore, the quantity of image change MD may alternatively be determined by sampling pixels.

Threshold Thresh 1 and threshold Thresh 2 are defined in advance as thresholds for determining if the image moves or not. In other words, the quantity of image change MD is compared with these thresholds. The threshold Thresh 1 is used to determine if there is a move or not. The CPU 206 determines that there is no move if the quantity of image change MD is smaller than the threshold Thresh 1.

The threshold Thresh 2 is used to determine if the move, if any, requires the movie mode to be selected or not. Even if there is a move such as a move of a shadow or that of placing a pen in the still mode, it may not be necessary to select the movie mode provided that the move is smaller than the threshold Thresh 2.

If the quantity of image change MD is smaller than the threshold Thresh 2, the CPU 206 determines that it represents only a slight move and hence it is not necessary to select the movie mode. The threshold Thresh 2 is defined to be higher than the threshold Thresh 1 (Thresh 1<Thresh 2). The memory 201 stores the thresholds Thresh 1 and Thresh 2 in advance.

When the CPU 206 switches from the movie mode to the still mode because there is not any move, it waits for a predetermined period of time. More specifically, the CPU 206 measures the stationary time Ptime after it determines that there is not any move. The memory 201 stores a predetermined period of time Holdtime that is compared with the stationary time Ptime.

The projector 2 forms an image of the original 4 by projecting light onto a screen 3. The document camera 1 and the projector 2 are connected to each other typically by way of an RGB cable 15. The document camera 1 outputs the image data of the original 4 taken by the camera section 11 to the projector 2 by way of the cable 15.

Now, the operation of the imaging/image projection apparatus of Embodiment 1 will be described below.

As the user turns on the power source of the imaging/image projection apparatus, the CPU 206 of the document camera 1 reads out the program code from the program code memory device 205 and executes the basic projection process.

The basic projection process will be described by referring to the flowchart of FIG. 5.

Firstly, the CPU 206 initializes the camera defining parameters including those of the focal point the exposure, the white balance of the camera section 11 of the document camera 11 (step S11).

Then, the CPU 206 initializes the imaging mode to the movie mode (step S12). More specifically, the CPU 206 selects the movie mode for the specified region on the memory 201 in order to initialize the imaging mode. Then, the CPU 206 so controls the operation that the image data read out from the image sensor 102 of the camera section 11 may be used as those of VGA.

As a result, the scene being shot by the camera section 11 is transmitted to the image sensor 102 by way of the optical lens section 101 as converged light and the image sensor 102 prepares a low resolution digital image as movie on the basis of the image of the converged light. Then, the image sensor 102 transmits the prepared digital image periodically to the memory 201 typically at a rate of 30 frames per second.

Then, the CPU 206 resets the stationary time Ptime (step S13).

Thereafter, the CPU 206 controls the image sensor 102 and the memory 201 so as to transfer the image data for the low resolution digital image to the memory 201 from the image sensor 102 (step S14). Note that only the image data is transferred to the memory 201 and no image is displayed on the display device 202. No image is displayed on the display device 202 because the image data for displaying the image on the display device 202 is stored in a region indicated by a different address on the memory 201.

Then, the CPU 206 determines the quantity of image change MD between the image obtained last time and the current image according to the equation 1 (step S15).

Subsequently, the CPU 206 determines if the imaging mode is the movie mode or the still mode (step S16).

In the initial state, the movie mode is selected for the imaging mode. Therefore, the CPU 206 determines that the imaging mode is the movie mode in the initial state and copies the image data of the moving image stored in the memory 201 to a predetermined region of the memory 201 in order to project the picked-up moving image (step S17). As a result, the display device 202 reads the image data of the picked-up moving image from the memory 201 and outputs the RGB signal to the projector 2. The projector 2 projects the image according to the signal.

The CPU 206 compares the above-described predetermined threshold Thresh 1 and the quantity of image change MD determined at step S15 and determines if there is a move in the image or not on the basis of the outcome of the comparison (step S18).

At this time, if the user is still continuing the motion of placing a sheet of paper or the like, the quantity of image change MD will exceed the threshold Thresh 1. In such a case, the CPU 206 determines that there is a move in the image (YES at step S18) and resets the stationary time Ptime to read the image data for the low resolution digital image. Then, the CPU 206 determines the quantity of image change MD and writes the data in the projection image region of the memory 201 (steps S13 through S17). As a result, the imaging/image projection apparatus keeps on the movie mode so that a low resolution moving image is projected on the screen 3.

Thereafter, as the user finishes placing the sheet of paper and hence there is no longer any move in the image, the quantity of image change MD falls below the threshold. Then, the CPU 206 determines that there is no move in the image (NO at step S18) and adds 1 to the stationary time Ptime (step S19).

Then, the CPU 206 determines if the stationary time Ptime has got to a predetermined period of time HoldTime or not (step S20).

If it is determined that the stationary time Ptime has not got to the predetermined period of time HoldTime (NO at step S20) yet, the CPU 206 reads in the image data for the low resolution digital image once again and determines the quantity of image change MD. Then, if there is no longer any move in the image, the CPU 206 adds 1 to the stationary time Ptime (steps S14 through S19). In this case, since the stationary time Ptime is not reset, it is counted up by the CPU 206 each time the CPU 206 reads the image data for the moving image.

If, on the other hand, it is determined that the stationary time Ptime has got to the predetermined period of time Hold-Time (YES at step S20), the CPU 206 determines that the user holds the move of the image and selects the still mode for the imaging mode (step S21).

The CPU 206 controls the image sensor 102 so as to pick up a high resolution still image (step S22). Then, the CPU 206 writes the image data acquired by the image sensor 102 in the memory 201. Note that, after writing the image data in the memory 201, the CPU 206 brings back the resolution of the camera section 11 to the low resolution for imaging.

The CPU 206 controls the image processing apparatus 203 and the image processing apparatus 203 extracts projection parameters necessary for oblique correction for the picked-up high resolution still image (step S23). The projection parameters indicate the relationship between the shape of the image of the original 4 and the actual shape of the original 4.

Furthermore, the image processing apparatus 203 cuts out the object of projection and also operates for projection transformation to acquire a proper square image according to the extracted projection parameters (step S24).

The image processing apparatus 203 extracts image effect correction parameters that are to be used for transforming the corrected image into a clear and easily identifiable image by performing certain processes including correction of the contrast (step S25).

Then, the image processing apparatus 203 performs an image effect process, using the extracted image effect correction parameters (step S26).

Then, the CPU 206 writes the image data of the corrected image to a predetermined region of the memory 201 in order to project the image data having been subjected to image effect process as in the case of a moving image. Then, the CPU 206 outputs the image data from the display device 202 to the projector 2 as RGB signal (step S27).

Once the still mode is selected, the CPU 206 resets the stationary time Ptime once again to read the image data for the low resolution digital image and then determines the quantity of image change MD (steps S13 through S15).

If it is determined here that the imaging mode is the still mode (NO at step S16), the CPU 206 compares the determined quantity of image change MD and the other predetermined threshold Thresh 2 (Thresh 1<Thresh 2) to determine if there is a move in the image or not (step S28).

If the quantity of image change MD is smaller than the threshold Thresh 2, the CPU 206 determines that there is not any move in the image (NO at step S28). Then, subsequently, the CPU 206 compares the quantity of image change MD and the threshold Thresh 1 to determine if there is a move in the image or not (step S30).

If the quantity of image change MD is not smaller than the Thresh 2, the CPU 206 determines that there is a move in the image (YES at step S30) and selects the movie mode for the imaging mode (step S40). Then, the CPU 206 resets the stationary time Ptime (step S12).

If, on the other hand, the quantity of image change MD is smaller than the threshold Thresh 2 but not smaller than threshold Thresh 1, the CPU 206 determines that there is a move (YES at step S30). In this case, since the quantity of image change MD is between the threshold Thresh 1 and the threshold Thresh 2, the CPU 206 picks up a high resolution still image once again without selecting the movie mode for the imaging mode and the image processing apparatus 203 performs an image process on the image data of the acquire high resolution still image (steps S22 through S27).

If the quantity of image change MD is smaller than the threshold Thresh 2 and also smaller than the threshold Thresh 1, the CPU 206 determines that the stationary state is continuing (NO at step S30). In this case, the CPU 206 determines if any of the image regulation keys is operated or not according to the operation information output from the operation unit 204 to obtain command information for regulating the image effect (step S31).

If it is determined that none of the image regulation keys is operated (NO at step S31), the CPU 206 returns to step S13 to rest the stationary time Ptime.

If, on the other hand, any of the image regulation keys is operated (YES at step S31), the CPU 206 performs the specified regulating operation for the purpose of image transformation, which may be enlarging and/or rotating the image (step S32).

Then, the CPU 206 determines if the image transformation is projection transformation of the image, rotating the image or the like or enlarging the image, reducing the image, moving the image or the like (step S33).

If the CPU determines that the image transformation is projection transformation of the image, rotating the image or the like, the image processing apparatus 203 extracts image effect correction parameters once again under the control of the CPU 206 (step S25) and performs an image effect process (step S26). If, on the other hand, the CPU 206 determines that the image transformation is enlarging the image, reducing the image, moving the image or the like, the image processing apparatus 203 performs an image effect process, using the image effect correction parameters that are extracted from the image last time (step S26).

In this way, the CPU 206 controls the operation of projecting the image, while selecting either the movie mode or the still mode. As a result, so long as the user is operating the imaging/image projection apparatus, priority is given to the frame frequency for image projection. On the other hand, once the image becomes stationary, the original 4, which is the shooting target, is cut out and an image effect process is performed to project a high resolution image.

Now, the image process of the image processing apparatus 203 will be described below.

Firstly, the basic concept of affine transformation that is used for (realizing) the image process will be described.

Affine transformation is being widely used for spatial transformation of images. In this embodiment, projection transformation is realized not by using three-dimensional camera parameters but by using two-dimensional affine transformation. The coordinates (u, v) of a point before transformation is related by transformation such as move, enlargement, reduction, turn or the like and the coordinates (x,y) of the point after transformation is related by the formula 2 below. Affine transformation is also used for projection transformation.

$$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \quad \text{Equation 2}$$

The ultimate coordinates (x,y) are computed by an equation 3 below.

$$x = \frac{x'}{z'} = \frac{a_{11}u + a_{21}v + a_{31}}{a_{13}u + a_{23}v + a_{33}} \quad \text{Equation 3}$$

$$y = \frac{y'}{z'} = \frac{a_{12}u + a_{22}v + a_{32}}{a_{13}u + a_{23}v + a_{33}}$$

The equation 3 is for projection transformation. The coordinates (x,y) are reduced toward 0 according to the value of z'.

In other words, the parameters contained in z' affects the projection. The parameters are a13, a23 and a33. Since the other parameters can be normalized by parameter a33, it is possible to make a33 equal to 1.

Figure 6:
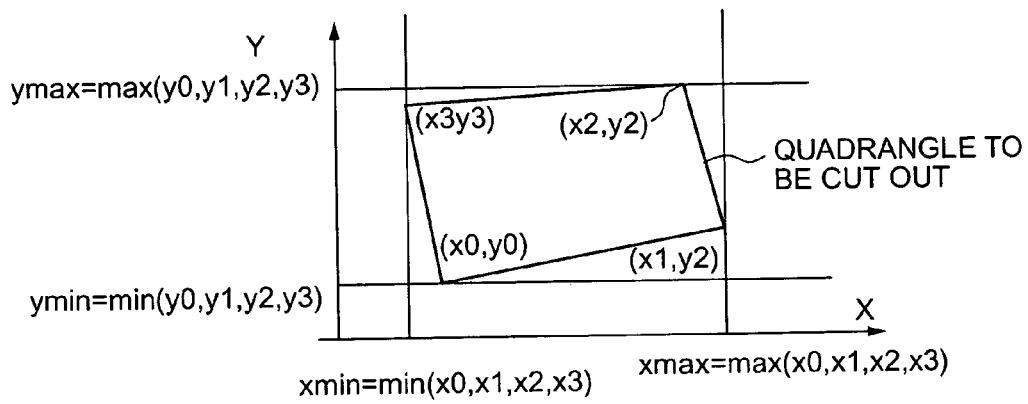
FIG. 6 is a schematic illustration of the cutting out process to be executed by the image processing apparatus in FIG. 2.

FIG. 6 shows the coordinates of each of the corners of the quadrangular original 4 shown in FIG. 3A. The relationship between the quadrangle picked up by the camera section 11 and the image of the actual original 4 will be described by referring to FIG. 7.

Figure 7:
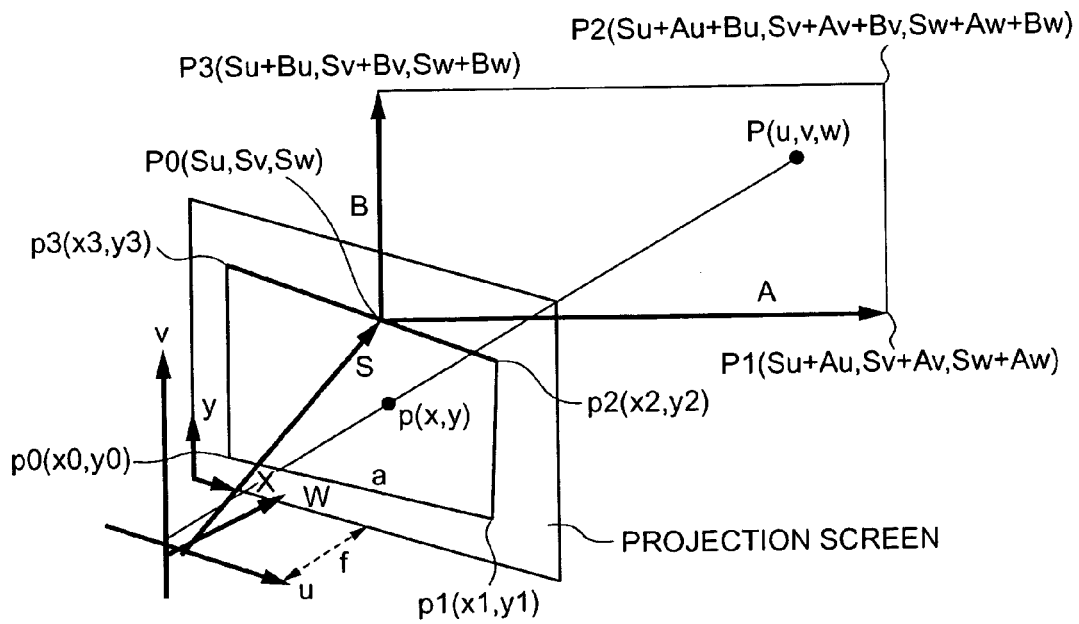
FIG. 7 is a schematic illustration of the basic concept of extraction of projection parameters and affine transformation.

Referring to FIG. 7, the U-V-W coordinate system is the three-dimensional coordinate system of the image that is picked up by the camera section 11. Vector A(Au, Av, Aw) and vector B(Bu, By, Bw) show the sheet of the original 4 in the three-dimensional coordinate system U-V-W.

Vector S(Su, Sv, Sw) shows the distance between the origin of the three-dimensional coordinate system U-V-W and the original 4 in the coordinate system.

The projection screen shown in FIG. 7 is used to project an image of the original 4 (and corresponds to the screen 3 in FIG. 1).

If the coordinate system on the projection screen is an x,y coordinate system, the image projected on the screen can be taken for the image picked up by the camera section 11. It is assumed here that the projection screen is arranged vertically and separated from the origin by distance f as measured on the W-axis. An arbitrarily selected point P(u,v,w) on the sheet of the original 4 and the origin are connected by a straight line and it is assumed that the straight line intersects the projection screen at point p(x,y) as expressed by using an X-Y coordinate system. Then, the coordinates of the point p are expressed by an equation 4 below as a result of projection transformation.

$$\begin{cases} x = u\dfrac{f}{w} \\ y = v\dfrac{f}{w} \end{cases} \quad \text{Equation 4}$$

From the equation 4 and the relationship between the points P0, P1, P2, P3 and the points p0, p1, p2, p3 projected onto the projection screen as shown in FIG. 7, the relationships expressed by an equation 5 below are obtained.

$$\begin{cases} Su = k1 \cdot x0 \\ Sv = k1 \cdot y0 \\ Sw = k1 \cdot f \end{cases} \quad \text{Equation 5}$$

$$\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$$

$$\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$$

where k1=Sw/f.

Then, the projection coefficients $\alpha$, $\beta$ are expressed by an equation 6 below.

$$\alpha = \dfrac{(x0 - x1 + x2 - x3) \cdot (y3 - y2) - (x3 - x2) \cdot (y0 - y1 + y2 - y3)}{(x1 - x2) \cdot (y3 - y2) - (x3 - x2)(y1 - y2)} \quad \text{Equation 6}$$

-continued $$\beta = \dfrac{(x1 - x2) \cdot (y0 - y1 + y2 - y3) - (x0 - x1 + x2 - x3) \cdot (y1 - y2)}{(x1 - x2) \cdot (y3 - y2) - (x3 - x2)(y1 - y2)}$$

Now, projection transformation will be described below.

An arbitrarily selected point P on the original 4 is expressed by an equation 7 using the vectors S, A and B.

$$P = S + m \cdot A + n \cdot B \quad \text{Equation 7}$$

where m: the coefficient of vector A ($0 \leq m \leq 1$)

n: the coefficient of vector B ($0 \leq n \leq 1$).

By substituting the equation 7 by the, equation 5 the coordinates x and y are expressed respectively by an equation 8 below.

$$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases}$$

By applying the above relationships, it will be seen that the coordinate (x', y', z') is expressed by an equation 9 below.

$$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix} \quad \text{Equation 9}$$

By substituting the equation 9 by m, n, the corresponding point (x,y) of the picked-up image can be determined. While the corresponding point (x,y) may not necessarily be expressed by integers, the coordinate values of the point, or the pixel, can be determined by means of the image interpolation technique or some other technique.

Figure 5:
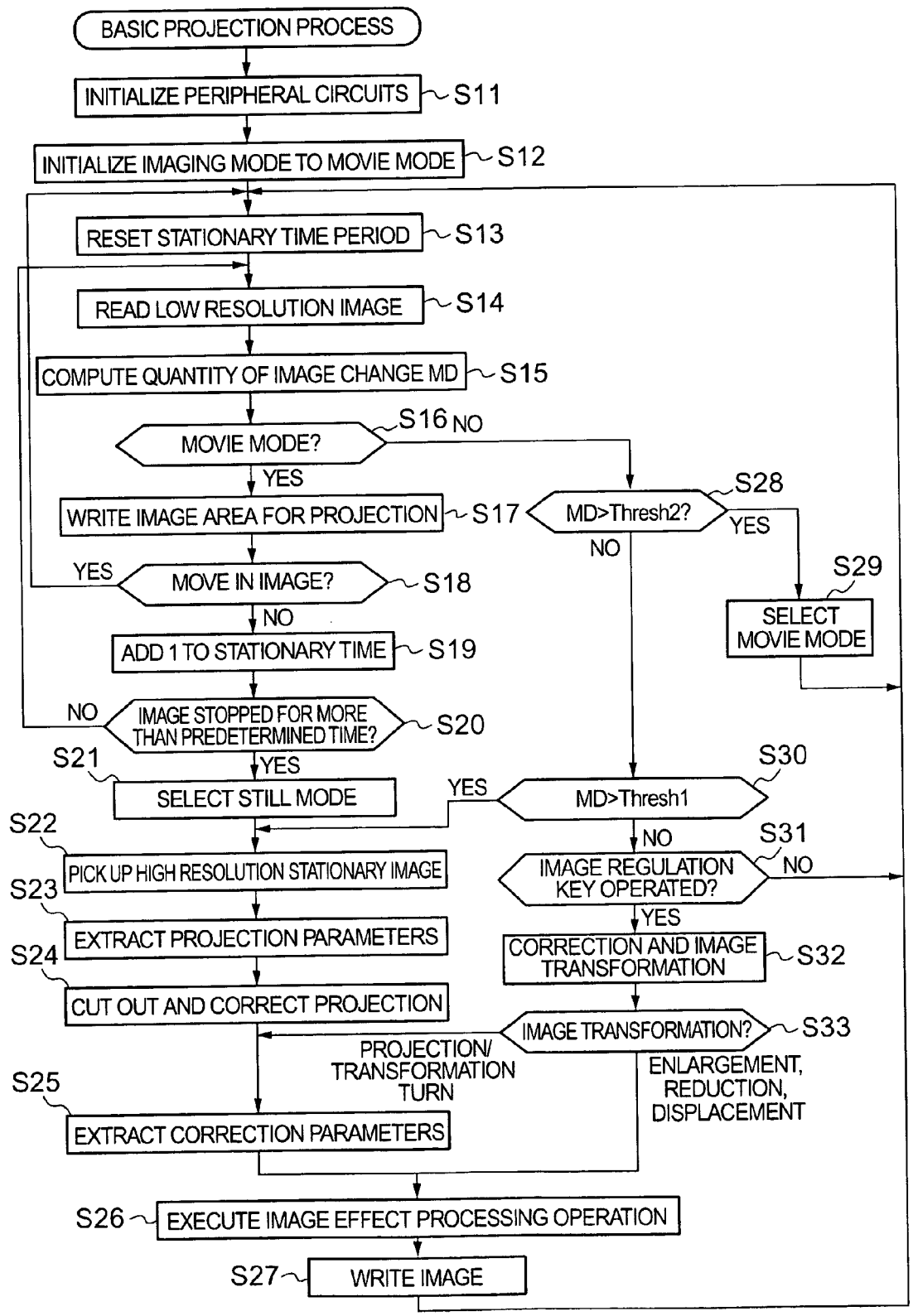
FIG. 5 is a flowchart of the basic projection process to be executed by the imaging/image projection apparatus of FIG. 1.

The image processing apparatus 203 firstly extracts projection parameters from the picked-up image of the original 4 for performing such affine transformation (step S23 in FIG. 5).

Now, the operation of projection parameter extracting process that the image processing apparatus 203 executes will be described by referring to the flowchart of FIG. 8.

Figure 9:
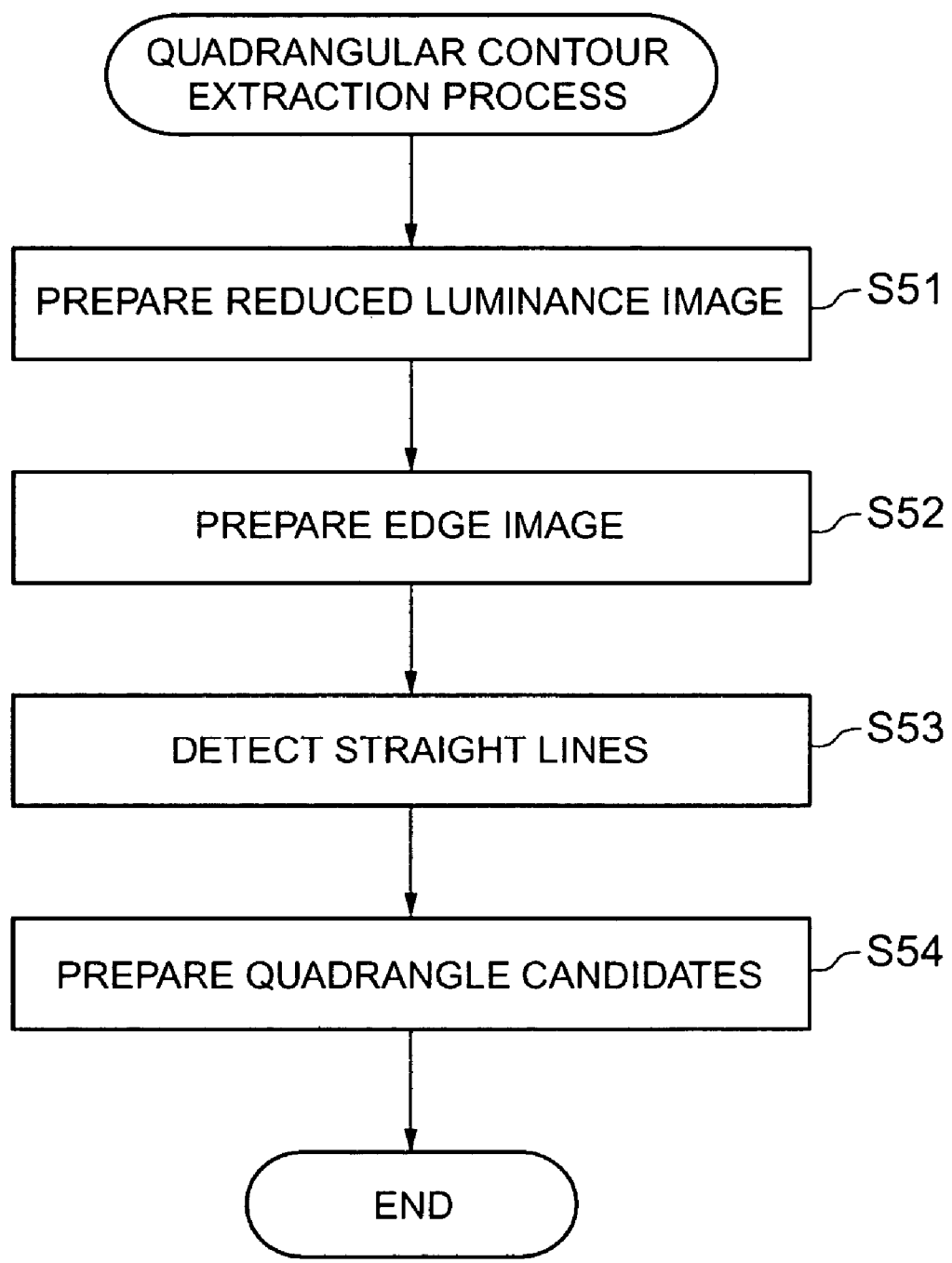
FIG. 9 is a flowchart of the quadrangle contour extraction process to be executed by the image processing apparatus in FIG. 2.

The image processing apparatus 203 extracts the coordinates of each of the four corners (the contour of the quadrangle) of the image of the original 4 (step S41). The image processing apparatus 203 extracts the contour of the quadrangle following the flowchart illustrated in FIG. 9.

More specifically, the image processing apparatus 203 generates a reduced luminance image from the input image in order to reduce the number of computational operations of the image processing process (step S51).

Then, the image processing apparatus 203 generates an edge image of the original 4 from the generated reduced luminance image (step S52).

Then, the image processing apparatus 203 detects the straight line parameters contained in the edge image (step S53).

Thereafter, the image processing apparatus 203 generates quadrangles as candidates for forming the contour of the original 4 from the detected straight line parameters (step S54).

Figure 8:
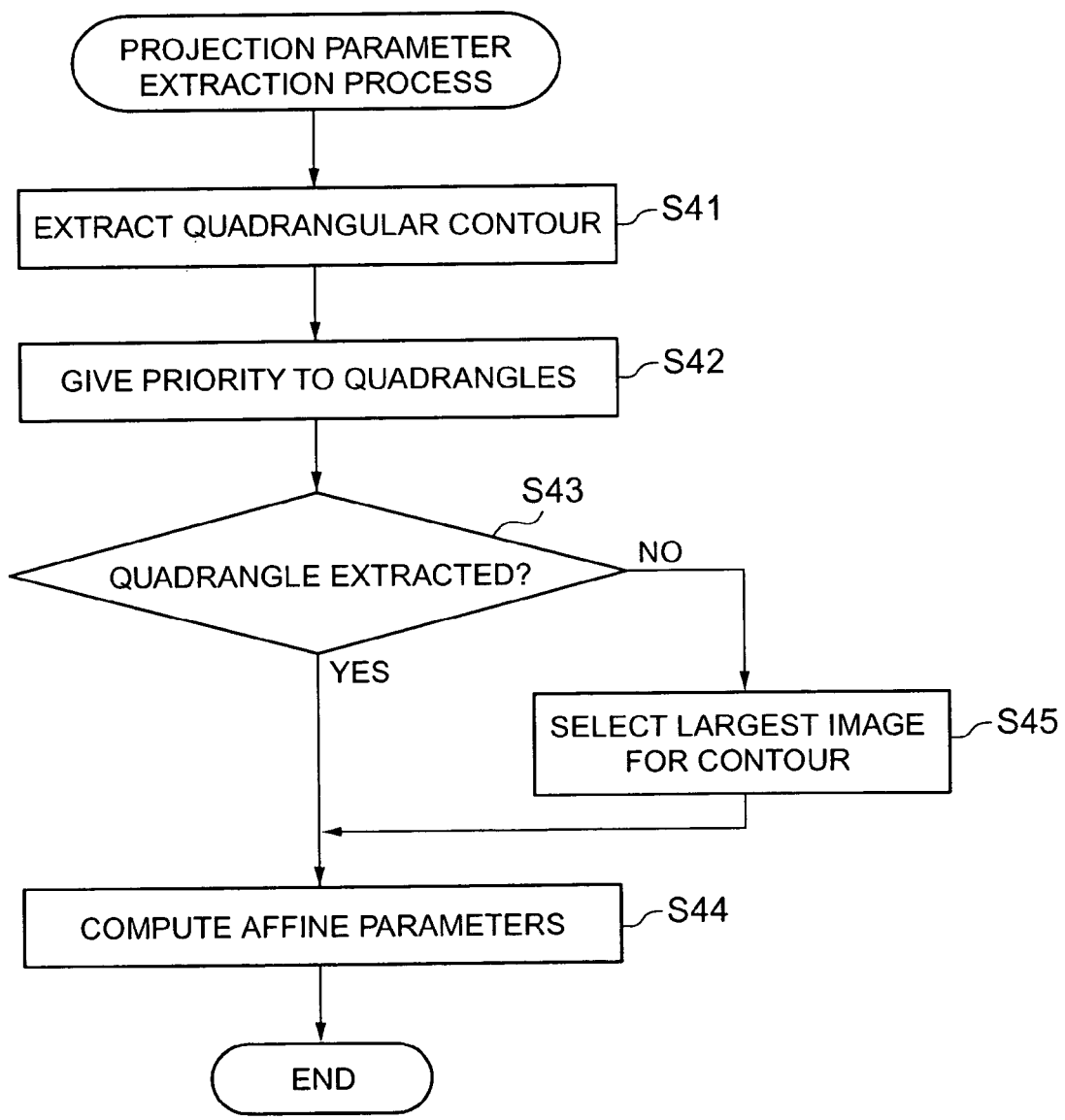
FIG. 8 is a flowchart of the projection parameter extraction process to be executed by the image processing apparatus in FIG. 2.

The image processing apparatus 203 generates quadrangles as candidates and gives priority to each of the generated quadrangles (step S42 in FIG. 8).

The image processing apparatus 203 selects a quadrangle according to the priority and determines if the selected quadrangle can be extracted or not (step S43).

If it is determined that the quadrangle can be extracted (YES at step S43), the image processing apparatus 203 acquires the quadrangle as the shape of the image of the original 4 and computes the affine parameters from the vertex of the acquired quadrangle (step S44).

If, on the other hand, it is determined that the quadrangle cannot be extracted (NO at step S43), the image processing apparatus 203 acquires the image of the quadrangle having the largest area as image of the original 4 (step S45) and computes the affine parameter from the vertex of the acquired quadrangle (step S44).

Now, the operation of the projection parameter extracting process will be described more specifically.

Figure 10A:
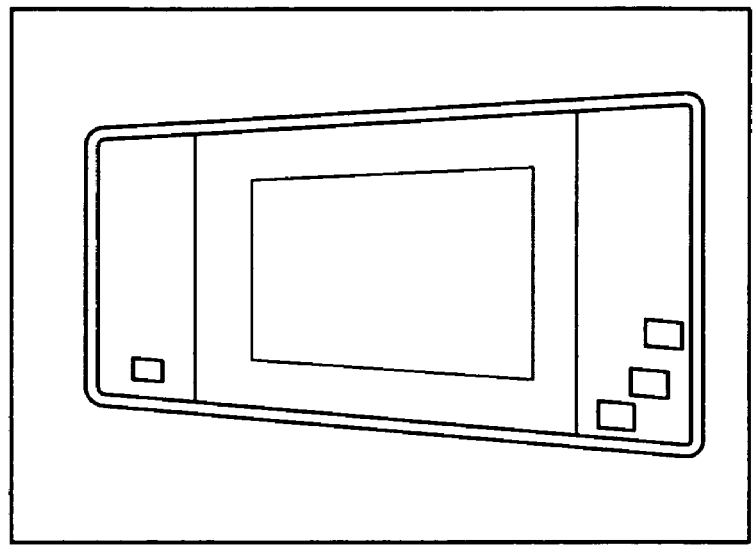
FIG. 10A is a schematic illustration of a reduced luminance image and FIG. 10B is a schematic illustration of an edge image.
Figure 10B:
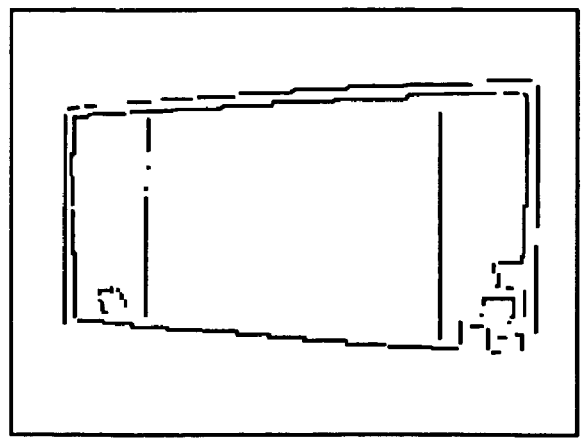

FIG. 10A shows a reduced luminance image generated at step S51 by the image processing apparatus 203 as an example. The image processing apparatus 203 generates an edge image as shown in FIG. 10B from such a reduced luminance image by using an edge detecting filter referred to as Roberts filter (step S52). A Roberts filter is a filter that detects the edges of an image by weighting two groups of four neighboring pixels to acquire two filters $\Delta 1$, $\Delta 2$ averaging them.

FIG. 11A illustrates the coefficients of the filter $\Delta 1$ and FIG. 11B illustrates those of the filter $\Delta 2$. The pixel value g(x,y) after transformation is expressed by an equation 10 below when the coefficient of the two filters $\Delta 1$, $\Delta 2$ are applied to the pixel value f(x,y) of certain selected coordinates (x,y).

$$g(x, y) = \sqrt{(\Delta 1)^2 + (\Delta 2)^2}$$  Equation 10

$$\Delta 1 = 1 \cdot f(x, y) + 0 \cdot f(x+1, y) +$$
$$0 \cdot f(x, y-1) + 1 \cdot f(x+1, y-1)$$
$$= f(x, y) - f(x+1, y-1)$$
$$\Delta 2 = 0 \cdot f(x, y) + 1 \cdot f(x+1, y) -$$
$$1 \cdot f(x, y-1) + 0 \cdot f(x+1, y-1)$$
$$= f(x+1, y) - f(x, y-1)$$

where g(x,y): pixel value of the coordinates (x,y) (after transformation)

f(x,y): pixel value of the coordinates (x,y) (before transformation).

The edge image illustrated in FIG. 10B contains straight line parameters. The image processing apparatus 203 detects the straight line parameters by Radon transformation of the edge image (step S53).

Radon transformation is integral transformation for establishing correspondence of n-dimensional data to (n−1)-dimensional data. More specifically, as shown in FIGS. 12A, 12B, take f(x,y) as image data and consider an r-θ coordinate system obtained by rotating from the x-y coordinate system by angle θ. The image projection data p(r,θ) in the θ direction is defined by an equation 11 below.

$$p(r, \theta) = \int_{-\infty}^{\infty} f(r\cos\theta - s\sin\theta, r\sin\theta + s\cos\theta) ds$$  Equation 11
$$= \int_{-\infty}^{\infty}\int_{-\infty}^{\infty} f(x, y)\delta(x\cos\theta + y\sin\theta - r) dx dy$$

where δ( ): Dirac's delta function.

The transformation of the equation 11 is referred to as Radon transformation.

The image data f(x,y) shown in FIG. 12A is transformed into image projection data p(r,θ) as shown in FIG. 12B by Radon transformation.

Figure 13A:
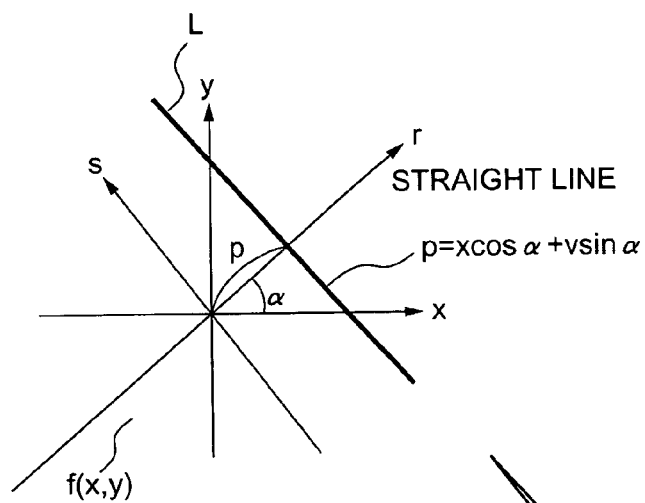
FIGS. 13A and 13B are schematic illustrations of an operation of acquiring data for a polar coordinate system by Radon transformation of a line of an X, Y coordinate system.
Figure 13B:
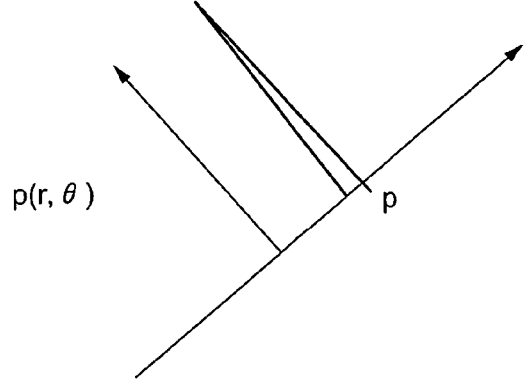

As a result of Radon transformation, a straight line L of the x-y coordinate system as shown in FIG. 13A is expressed by p=xcosα+ysinα in a polar coordinate system. Since all the straight line L is projected to point p(ρ,α), it is possible to detect the straight line by detecting the peak of p(ρ,α). The image processing apparatus 203 generates data p(r,θ) from the edge image by Radon transformation, using this principle.

Figure 14:
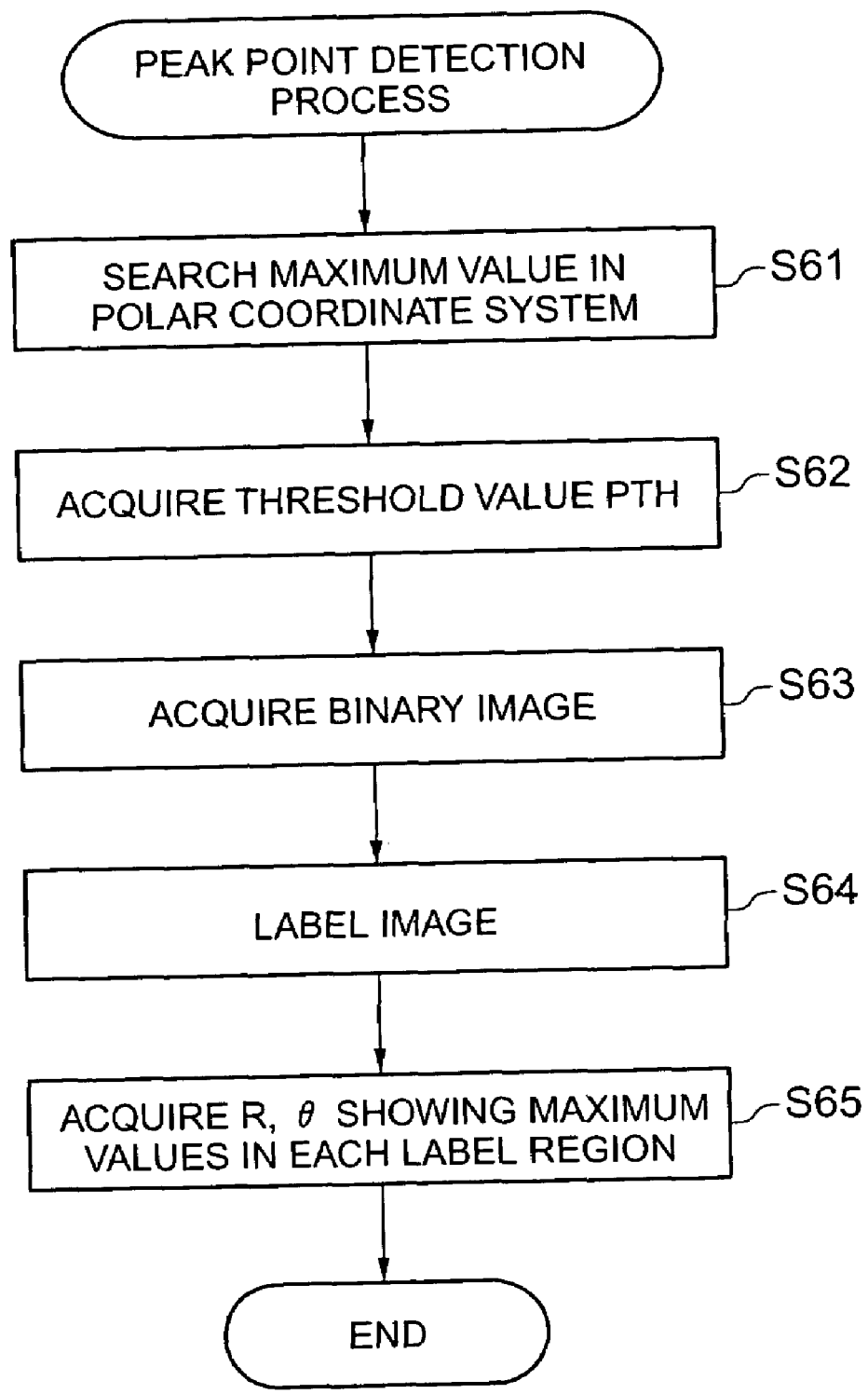
FIG. 14 is a flowchart of the process of detecting a peak point from the data for a polar system to be executed by the image processing apparatus in FIG. 2.

Then, the image processing apparatus 203 extracts the peak point from the generated data p(r,θ). The image processing apparatus 203 follows the flowchart of FIG. 14 for this peak point extracting process.

The image processing apparatus 203 firstly detects the maximum value pmax at p(r,θ) (step S61).

Then, the image processing apparatus 203 determines threshold pth=pmax*k (k is a constant value not smaller than 0 and not greater than 1) (step S62).

Then, the image processing apparatus 203 generates a binary image B(r,θ) from p(r,θ) using pth as threshold (step S63).

Thereafter, the image processing apparatus 203 performs an image labeling operation for B(r,θ). The number of labels obtained at this time is expressed by N1 (step S64).

The image processing apparatus 203 then checks r,θ at the maximum value of p(r,θ) in each label region. Then, the image processing apparatus 203 acquires each of the values as ri, θi (i=1 to N1) (step S65). These values are used as straight line parameters.

Next, the image processing apparatus 203 excludes remarkably distorted quadrangles from the candidates in order to generate quadrangle candidates (step S54) by using the detected straight line parameters. This is because it is safe to assume that a remarkably distorted quadrangle does not show the contour of the original 4 since the document camera 1 does not shoot an original 4 that is separated from the base seat 13 to a large extent.

More specifically, when four straight lines a1 through a4 are displayed on the display area of the LCD of the display device 202 along with the points of intersection p1 through p4 of the four straight lines as the original is picked up by the camera section 11, the straight lines a1 through a4 make candidates of straight lines that can form a quadrangle.

Figure 15A:
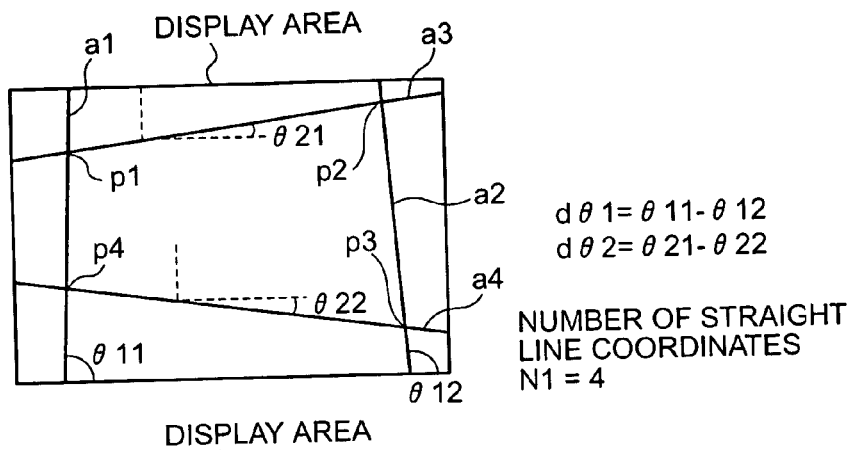
FIGS. 15A, 15B, 15C and 15D are schematic illustrations of the concept of detecting a quadrangle from the lines extracted by detecting peak points.
Figure 15B:
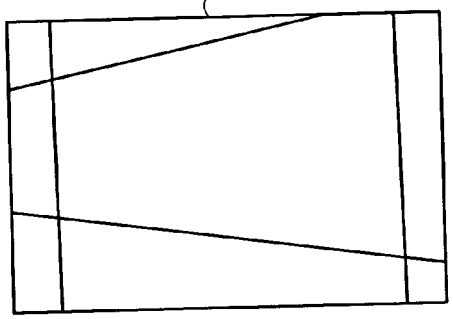
Figure 15C:
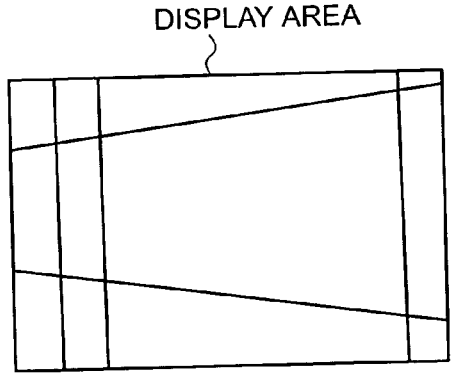

On the other hand, when the number of straight lines displayed on the display area is less than four or when four straight lines are displayed in the display area but the number of points of intersection is less than four as shown in FIGS. 15B and 15C, the set of straight lines does not make a candidate set of straight lines for forming a quadrangle.

If the angles formed by the bottom line of the display area and the straight lines a1 through a4 are θ11, θ12, θ21, θ22 respectively as shown in FIG. 15A, the angle most similar to the angle θ11 of the straight lineal is the angle θ12 of the straight line a2. Thus, the straight line a1 and the straight line a2 are determined to be those that are arranged oppositely.

Figure 15D:
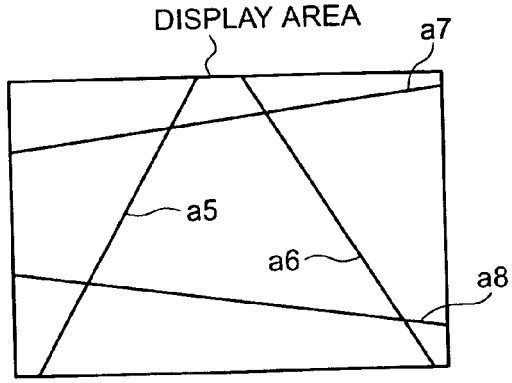

If the difference of the angles of the oppositely arranged straight lines a5 and a6 is large as shown in FIG. 15D, the set of straight lines a5 through a8 does not make a candidate set of straight lines for forming a quadrangle because the document camera 1 does not shoot the original 4 when the original 4 is at a position separated from the base seat 13 to a large extent. When the original 4 is placed on the base seat 13 and the angles of the straight lines are measured, it is possible to determine if the straight lines in the display area are those formed by the edges of the original 4 or not. Thus, if the angular differences of two pairs of straight lines that face each other of the four straight lines are dθ1 and dθ2, thresholds dθ1th, dθ2th are defined in advance respectively for the angular differences dθ1, dθ2 and stored in the memory 201.

From this point of view, the image processing apparatus 203 acquires candidate quadrangles from a plurality of straight lines. More specifically, the image processing apparatus 203 executes the quadrangle detecting process by following the flowchart of FIG. 16.

Figure 16:
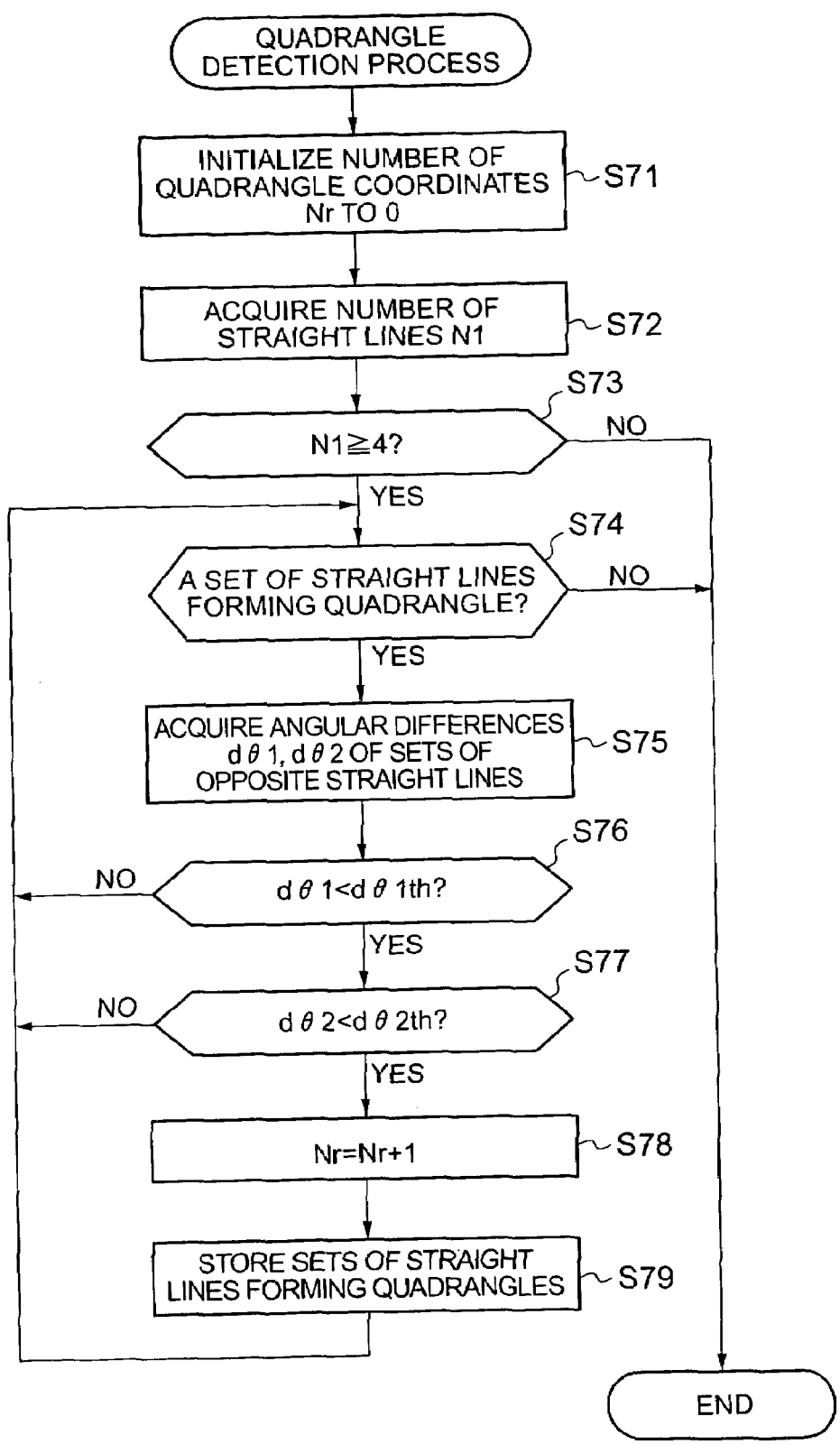
FIG. 16 is a flowchart of the quadrangle detection process to be executed by the image processing apparatus in FIG. 2.

Referring to FIG. 16, firstly the image processing apparatus 203 initializes the number of candidate quadrangles Nr to 0 (step S71).

Then, the image processing apparatus 203 acquires the number of straight lines N1 that are being displayed in the display area (step S72).

Thereafter, the image processing apparatus 203 determines if the acquired number of straight lines N1 is not smaller than 4 or not (step S73).

If it determined that the acquired number of straight lines N1 is smaller than 4 (NO at step S73), the image processing apparatus 203 terminates the process. In this case, the number of candidate quadrangles Nr is equal to 0.

If, on the other hand, it is determined that the acquired number of straight lines N1 is not smaller than 4 (YES at step S73), the image processing apparatus 203 determines if there is a set of straight lines that form a quadrangle or not (step S74).

If there is a set of straight lines but there are not four points of intersection of straight lines, the image processing apparatus 203 determines that there is not any set of straight lines that form a quadrangle (NO at step S74) and terminates the process.

If, on the other hand, it is determined that there is a set of straight lines that form a quadrangle (YES at step S74), the image processing apparatus 203 acquires the angular differences dθ1, dθ2 of the pairs of oppositely disposed straight lines (step S75).

Then, the image processing apparatus 203 determines if the angular difference dθ1 is smaller than dθ1th that is defined in advance or not (step S76).

If it is determined that the angular difference dθ1 is not smaller than the threshold dθ1th (NO at step S76), the image processing apparatus 203 repeats the process for the next candidate of a set of straight lines for forming a quadrangle (steps S74 through 75).

If, on the other hand, it is determined that the angular difference dθ1 is smaller than the threshold dθ1th (YES at step S76), the image processing apparatus 203 determines if the angular difference dθ2 is smaller than the threshold dθ2th or not (step S77).

If it is determined that the angular difference dθ2 is not smaller than the threshold dθ2th (NO at step S77), the image processing apparatus 203 repeats the process for the next candidate of a set of straight lines for forming a quadrangle (steps S74 through 76).

If, on the other hand, it is determined that the angular difference dθ2 is smaller than the threshold dθ2th (YES at step S77), the image processing apparatus 203 selects the quadrangle having four points of intersection as candidate and increments the number of candidates Nr by one(step S78) and stores the number of candidates Nr in the memory 201.

The image processing apparatus 203 then stores the set of straight lines that can form a quadrangle in the memory 201 (step S79).

If the image processing apparatus 203 determines that there is no longer any candidate for a set of straight lines that form a quadrangle as a result of repeating the process from step S74 to step S79 (NO at step S74), it terminates the quadrangle detecting operation.

Then, the image processing apparatus 203 selects the most adequate candidate that represents the edges of the original 4 out of the candidates of quadrangle.

Several methods are conceivable for the selection. In this embodiment, the outermost quadrangle is selected as most adequate candidate out of the picked-up quadrangles. The outermost quadrangle is defined as the quadrangle that is surrounded by two pairs of lines running respectively in parallel with the X-axis and the Y-axis, or two pairs of lines forming a rectangle, as shown in FIG. 6 and makes the area largest.

If the coordinates of the four corners of the rectangle Ri are (x0,y0), (x1,y1), (x2,y2), (x3,y3), the area of the quadrangle is expressed by an equation 12 below.

$$Si=\{\max(x0,x1,x2,x3)-\min(x0,x1,x2,x3)\}*\\\{\max(y0,y1,y2,y3)-\min(y0,y1,y2,y3)\}\qquad\text{Equation 12}$$

Figure 17:
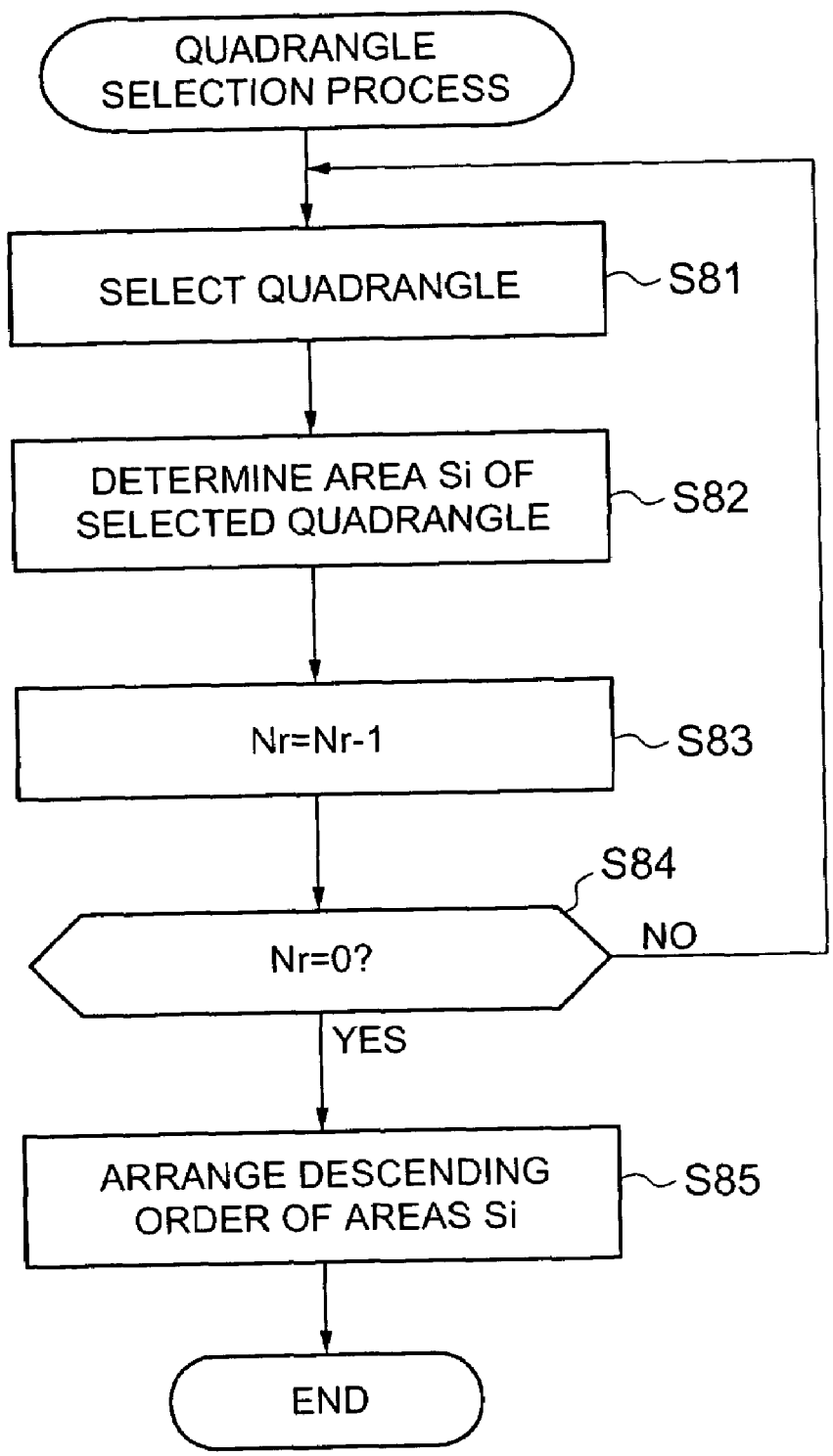
FIG. 17 is a flowchart of the quadrangle selection process to be executed by the image processing apparatus in FIG. 2.

The image processing apparatus 203 selects the quadrangle, following the flowchart of FIG. 17.

The image processing apparatus 203 selects a candidate quadrangle out of the Nr candidate quadrangles (step S81).

Then, the image processing apparatus 203 determines the area of the selected quadrangle, using the equation 12 (step S82).

Then, the image processing apparatus 203 decrements the number of candidate quadrangles Nr by one (step S83).

The image processing apparatus 203 determines if the number of candidates Nr is equal to 0 or not (step S84).

If it is determined that the number of candidates Nr is not equal to 0 (NO at step S84), the image processing apparatus 203 repeats the process from step S81 to step S83.

When it is determined that the number of candidates Nr has become equal to 0 as a result of repeating the process (YES at step S84), the image processing apparatus 203 rearranges the data of the candidate quadrangles in the descending order of the determined areas Si (step S85).

Then, the image processing apparatus 203 selects the first quadrangle as the highest priority quadrangle showing the contour of the original. In this way, if there are a plurality of candidate quadrangles, the outermost quadrangle is always selected as the highest priority quadrangle. This is because, in the case of an original 4 containing texts/pictures, while one or more than one quadrangles may be contained in the original 4, no quadrangle will be found outside the original 4. Additionally, in the case of a quadrangular table being shot, the user can adjust the zoom lens and the shooting position with ease so that the user may be able to extract the contour of the shooting target.

(1) Extraction of Affine Parameters from the Image of the Original 4

Now, the method of determining the projection parameters (affine parameters) from the selected quadrangle will be described below.

It is possible to determine the affine parameters that are the elements of the matrix of the equation 9 by using the coordinates of the four corners of the selected quadrangle (x0,y0), (x1,y1), (x2,y2), (x3,y3) and the equations 6 and 8.

The unit of the coordinate system is modified because m and n are defined respectively to be $0 \leq m \leq 1$ and $0 \leq n \leq 1$. More specifically, the size of the image is scaled at the U-axis side and at the V-axis side respectively by usc and vsc without shifting the center of the image. If the center of the image is uc, vc, the scale conversion of the image is expressed by an equation 13 below.

$$u = m/usc + 0.5 - uc/usc$$

$$v = n/vsc + 0.5 - vc/vsc \qquad \text{Equation 13}$$

The coordinates (x', y', z') of the quadrangle after the scale conversion is expressed by an equation 14 below, using u, v.

$$(x', y', z') = (u, v, 1) \cdot Af \qquad \text{Equation 14}$$

where Af represents the affine transformation matrix.

The affine transformation matrix Af is expressed by an equation 15 below.

$$Af = \begin{pmatrix} 1/u_{sc} & 0 & 0 \\ 0 & 1/v_{sc} & 0 \\ 0.5 - \dfrac{u_c}{u_{sc}} & 0.5 - \dfrac{v_c}{v_{sc}} & 1 \end{pmatrix} \cdot \begin{pmatrix} x_1 - x_0 + \alpha \cdot x_1 & y_1 - y_0 + \alpha \cdot y_1 & \alpha \\ x_3 - x_0 + \beta \cdot x_3 & y_3 - y_0 + \beta \cdot y_3 & \beta \\ x_0 & y_0 & 1 \end{pmatrix} \qquad \text{Equation 15}$$

Note that each of the elements of the affine transformation matrix Af is an affine parameter.

From the equations 14 and 15, the aspect ratio k of the quadrangle that shows the relationship between the u-axis and the v-axis is expressed by an equation 16 below.

$$k = \frac{|B|}{|A|} = \frac{\sqrt{(x3 - x0 + \beta \cdot x3)^2 + (y3 - y0 + \beta \cdot y3)^2 + (\beta f)^2}}{\sqrt{(x1 - x0 + \alpha \cdot x1)^2 + (y1 - y0 + \alpha \cdot y1)^2 + (\alpha f)^2}} \qquad \text{Equation 16}$$

where f: camera parameter.

In the case of a document camera 1, the focal length of the camera section 11 is normally designed to be equal to the distance between the lens and the base seat 13 on which an original 4 is mounted. Therefore, the focal length of the camera section 11 may be made equal to the distance between the camera section 11 and the original 4. Anyway, in the case of a document camera 1, the focal length or the distance between the camera section 11 and the original 4 is known.

Note, however, in the case of an optical lens section 101 where the lens is a zoom lens, the focal length changes as a function of the extent of zooming. Therefore, the aspect ratio k=B/A (absolute values) can be computed when the focal lengths f are stored in a table or the like as a function of the different extents of zooming.

When the maximum image (screen) size (umax, vmax) that can be output to the screen 3 is given, uc and vc are expressed respectively by an equation 17 below.

$$uc = umax/2$$

$$vc = vmax/2 \qquad \text{Equation 17}$$

When vmax/umax>k and vmax/umas$\leq$k, an image having a desired aspect ratio k can be obtained by scaling the image, using equations 18 and 19 respectively.

$$usc = umax$$

$$vsc = k*umax \qquad \text{Equation 18}$$

$$usc = vmax/k$$

$$vsc = vmax \qquad \text{Equation 19}$$

Figure 18:
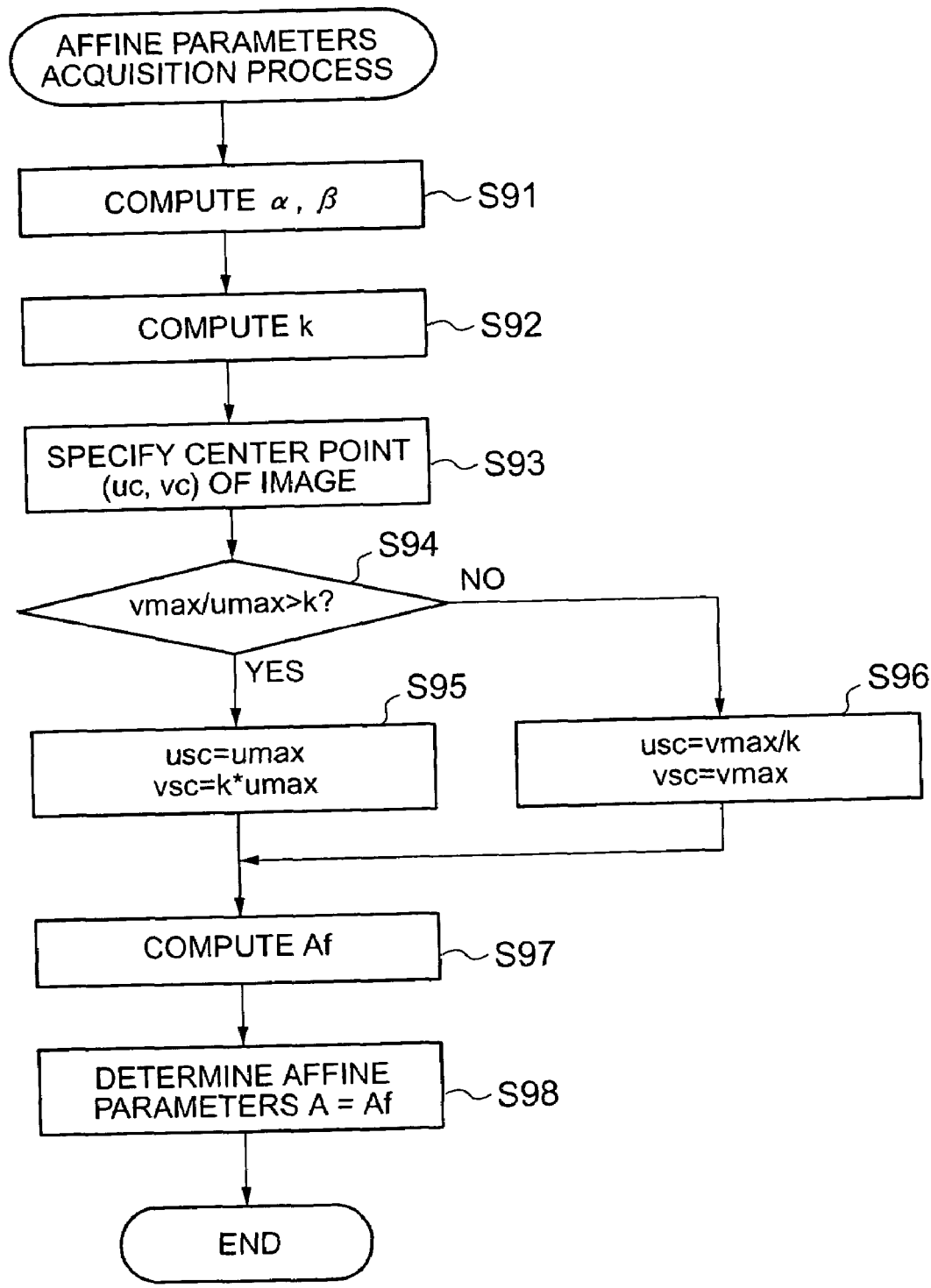
FIG. 18 is a flowchart of the process of determining affine parameters from the corners of a quadrangle to be executed by the image processing apparatus of FIG. 2.

On the basis of the above-described idea, the image processing apparatus 203 acquires affine parameters from the corners of the quadrangle. This process will be described by referring to the flowchart of FIG. 18.

Firstly, the image processing apparatus 203 computes the projection coefficients $\alpha, \beta$ by using the coordinates of the four corners of the quadrangle (x0,y0), (x1,y1), (x2,y2), (x3,y3) and the equation 6 (step S91).

Then, the image processing apparatus 203 computes the aspect ratio k of the original 4, using the equation 16 (step S92).

Thereafter, the image processing apparatus 203 specifies the center (uc, vc) of the image, using the equation 17 (step S93).

Then, the image processing apparatus 203 compares the vmax/umax of the largest image size and the aspect ratio k expressed by the equation 16 (step S94).

If vmax/umax>k (YES at step S94), the image processing apparatus 203 determines that largest image size at the V-axis side (longitudinal side), or vmax, is greater than the corresponding size of the image of the original 4 provided that the aspect ratio k is not changed. Then, the image processing apparatus 203 determines usc, vsc, using the equation 18 so as to make the largest image size agree with the corresponding size of the image of the original 4 at the side of the U-axis side and decides the scale of the image of the original 4 at the V-axis side (step S95).

If, on the other hand, vmax/umax$\leq$k (NO at step S94), the image processing apparatus 203 determines that the largest image size at the U-axis side (transversal side), or umax, is greater than the corresponding size of the image of the original 4 provided that the aspect ratio k is not changed. Then, the image processing apparatus 203 determines usc, vsc, using the equation 19 so as to make the largest image size agree with the corresponding size of the image of the original 4 at the side of the V-axis side and decides the scale of the image of the original 4 at the U-axis side (step S96).

Then, the image processing apparatus 203 determines the affine transformation matrix Af, using the equation 15, from the computed usc, vsc, uc, vc and the coordinates of the four corners of the quadrangle (x0,y0), (x1,y1), (x2,y2), (x3,y3) (step S97).

Then, the image processing apparatus 203 acquires the affine parameters A, which are the elements of the affine transformation matrix Af (step S98).

(2) Image Transformation Using the Extracted Affine Parameters

Now, the image processing method of preparing a corrected image by using the acquired affine parameters will be described below.

Figure 19:
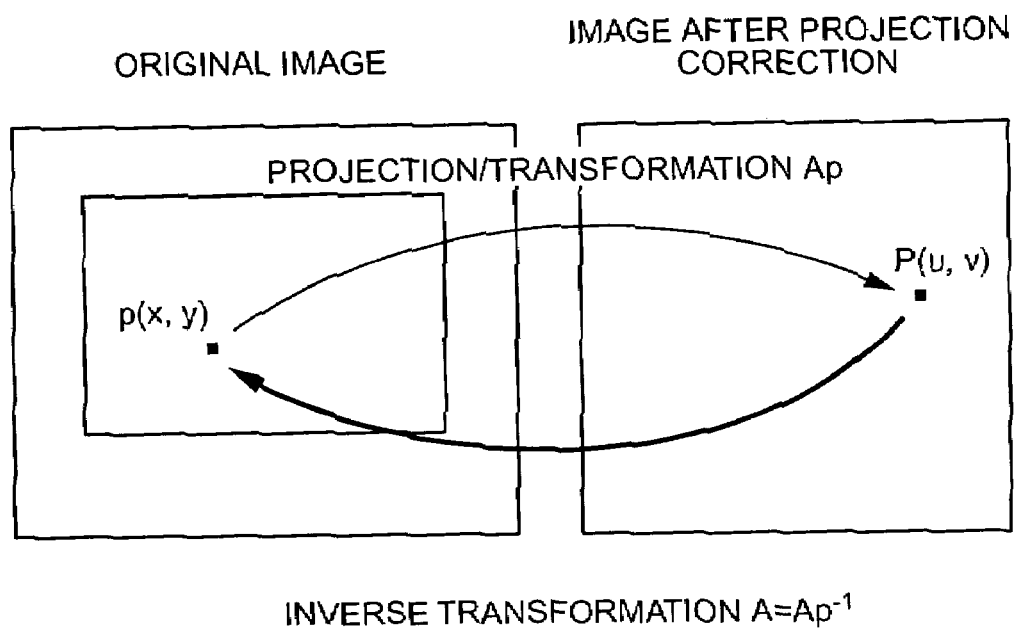
FIG. 19 is a schematic illustration of inverse transformation for acquiring the original image from an image obtained after projective transformation.

Firstly, for affine transformation, which may be projection transformation or some other transformation, using the affine parameters, assume that point p(x,y) of the original image corresponds to point P(u,v) of the image obtained by the transformation, which may be projection transformation, using a transformation matrix Ap as shown in FIG. 19. Then, it is more preferable to determine the point p(x,y) of the original image that corresponds to the point P(u,v) of the transformed image than to determine the point P(u,v) of the transformed image that corresponds to the point p(x,y) of the original image.

An interpolation method that is derived from the bilinear method is used here to determine the coordinates of the point P of the transformed image. The interpolation method derived from the bilinear method is a method of detecting the coordinates of the point of an image (transformed image) that correspond to the coordinates of a point of another image (original image) and determining the (pixel) value of the point P(u,v) of the transformed image from the (pixel) values of four peripheral points of the point (as expressed by coordinates) of the other image. With this method, the pixel value P of the point P of the transformed image is computed by an equation 20 below.

$$P(u,v)=(1-kx)*(1-ky)*p(X,Y)+kx*(1-ky)*p(X+1,Y)+ (1-kx)*ky*p(X,Y+1)+kx*ky*p(X+1,Y+1) \quad \text{Equation 20}$$

where
- kx: the decimal value of x,
- ky: the decimal value of y,
- X: integer part (x) and
- Y: integer part (y)

provided that the coordinates of the point p of the other image is expressed p(x,y).

Figure 20:
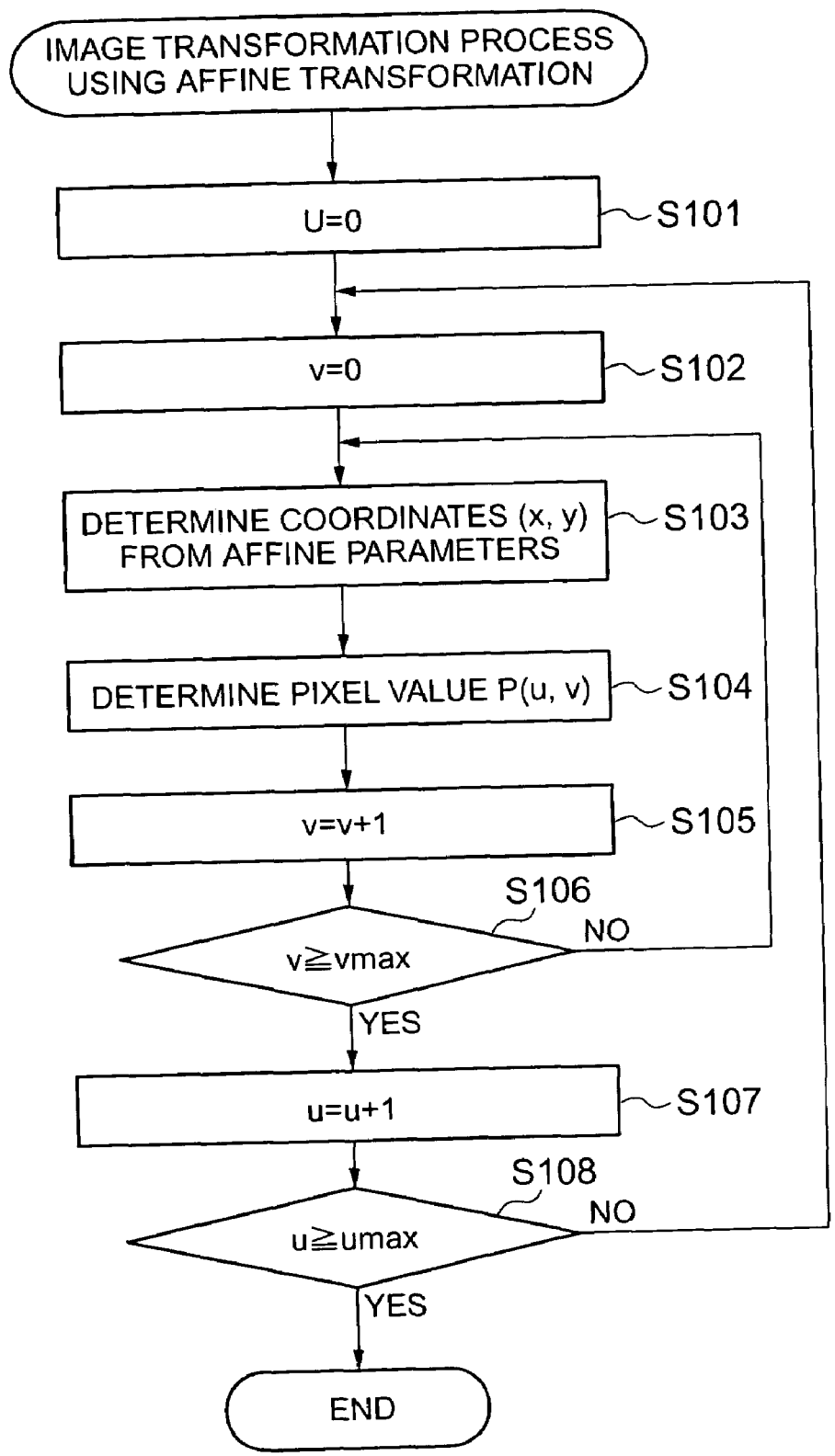
FIG. 20 is a flowchart of the image transformation process using affine transformation to be executed by the image processing apparatus in FIG. 2.

The image processing apparatus 203 executes the process of the flowchart of FIG. 20 in order to determine the point p(x,y) of the original image that corresponds to the point P(u,v) of the transformed image.

Firstly, the image processing apparatus 203 initializes the pixel position u of the transformed image to 0 (step S101).

Then, the image processing apparatus 203 initializes the pixel position v of the transformed image to 0 (step S102).

Then, the image processing apparatus 203 substitutes the pixel position (u,v) of the transformed image, using the affine parameters A obtained from the equation 15 and determines the pixel position (x,y) of the original image, using the equation 3 (step S103).

Thereafter, the image processing apparatus 203 determines the pixel value P(u,v) by means of the bilinear method, using the equation 20, from the determined pixel position (x,y) (step S104).

Then, the image processing apparatus 203 increments the coordinate v of the corrected image by one (step S105).

Then, the image processing apparatus 203 compares the coordinate v of the corrected image and the maximum value vmax of the coordinate v and determines if the coordinate v of the corrected image is not smaller than the maximum value vmax or not (step S106).

If it is determined that the coordinate v is smaller than the maximum value vmax (NO at step S106), the image processing apparatus 203 repeats the process of steps S103 through S105.

If it is determined that the coordinate v gets to the maximum value vmax as a result of repeating the process of steps S103 through S105 (YES at step S106), the image processing apparatus 203 increments the coordinate u of the corrected image by one (step S107).

The image processing apparatus 203 then compares the coordinate u of the corrected image and the maximum value umax of the coordinate u and determines if the coordinate u of the corrected image is not smaller than the maximum value umax or not (step S108).

If it is determined that the coordinate u is smaller than the maximum value umax (NO at step S108), the image processing apparatus 203 repeats the process of steps S102 through S107.

If it is determined that the coordinate u gets to the maximum value umax as a result of repeating the process of steps S102 through S107 (YES at step S108), the image processing apparatus 203 terminates the image transformation process.

(3) Extraction of Image Effect Correction Parameters Relating to Luminance or Color Difference and Image Effect Process Now, the process for extracting image effect correction parameters from the image obtained in the above-described manner and the image effect process that utilize the parameters will be described below. The image effect process is an operation for obtaining a clearer image.

Image effect correction parameters include the maximum value, the minimum value and the peak value of a luminance histogram, the peak value and the average value of a color difference histogram and other variables that are necessary for processing the image effect.

To extract image effect correction parameters, it is necessary to (3-a) cut out the image of the solid part of the original from the entire image except the contour and (3-b) generate a luminance histogram and a color difference histogram. Firstly, the process necessary for extracting image effect correction parameters will be described below.

(3-a) Cutting Out an Image

Figure 21:
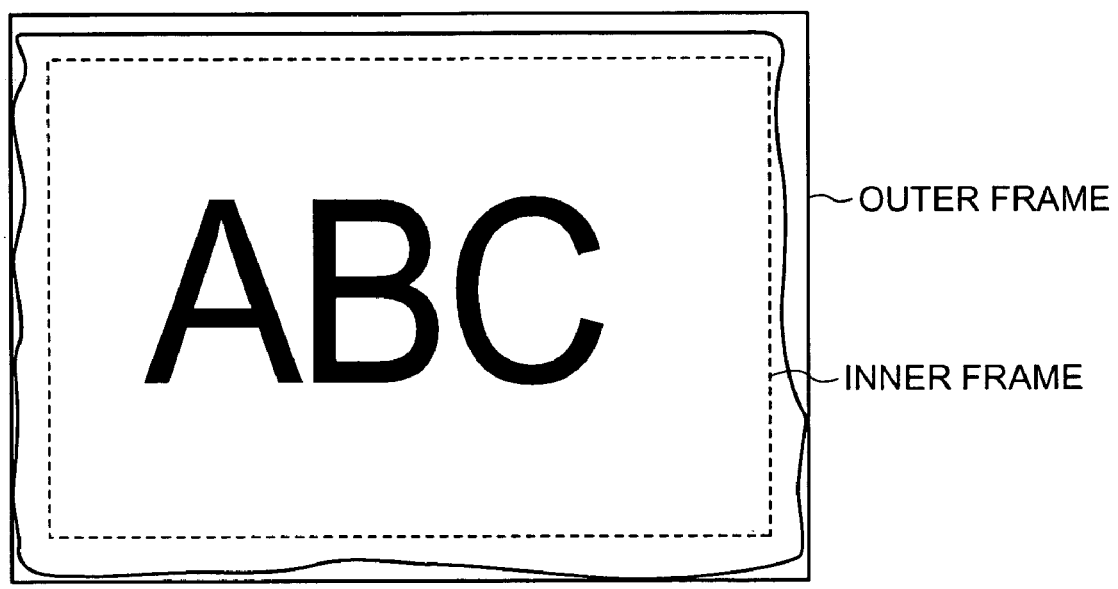
FIG. 21 is a schematic illustration of an exemplar image cut out by the image processing apparatus in FIG. 2.

As shown in FIG. 21, an image of the original 4 may contain not only solid parts such as photographs, graphics and characters but also the base seat 13 and the shadow of the sheet of the original 4 or the like that have nothing to do with the contents of the original 4. Therefore, an inner frame and an outer frame of the entire image are defined and then a real original section within the inner frame where the solid image of the original 4 is found and a peripheral part between the inner frame and the outer frame where the shadow of the sheet of the original 4 may typically be found are defined. Generally, the contour of the original 4 that is found in the peripheral part is black more often than not and there may be cases where it is preferable that the image data contains the data for the peripheral part.

However, when a histogram is generated to include an image of the peripheral part of the original 4, there can be cases where the histogram cannot be effectively extended.

Therefore, the image of the real original section is cut out to generate a luminance histogram and a color difference histogram only at the time of taking out image effect correction parameters from them and the entire area of the image is subjected to an image effect process, using the image effect correction parameters taken out from the histograms. The parameters can be acquired more effectively in this way.

More specifically, if the image data including the peripheral part are for M rows and N columns and the number of dots between the outer frame and the inner frame is K for both the X- and Y-directions, the pixel data for the M to K rows that are pixel data for the real original section are acquired at the X-axis side, while the pixel data for the N to K columns that are pixel data for the real original section are acquired at the Y-axis side. Then, the pixel data for the real original section are those of (M−2*K) rows and (N−2*K) columns.

(3-b) Generation of Luminance Histogram and Color Difference Histogram

Then, a luminance histogram and a color difference histogram are generated for the image of the real original section that is cut out in this way.

Figure 22A:
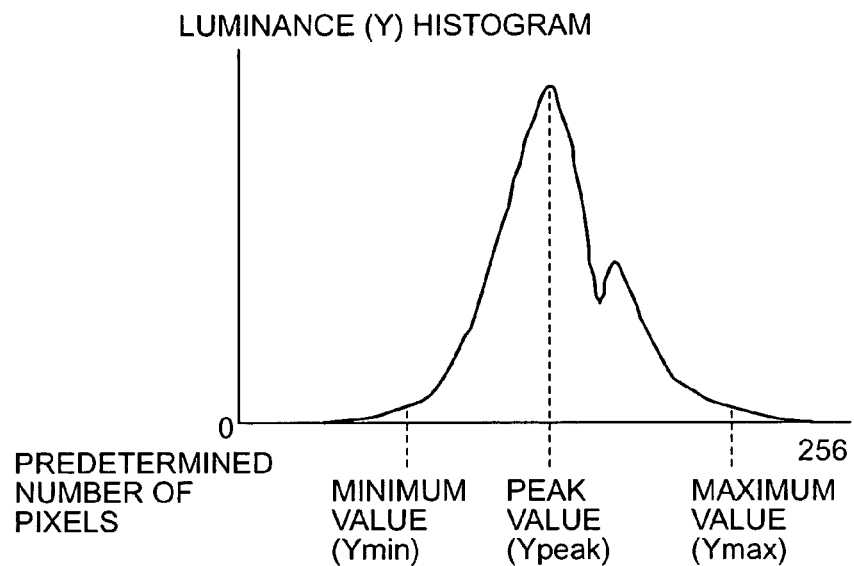
FIG. 22A is a schematic illustration of an exemplar luminance histogram and FIG. 22B is a schematic illustration of an exemplar color difference histogram.

The luminance histogram shows the distribution of the luminance values (Y) found in the real original section and is generated by counting the number of pixels of the real original section for each luminance value. FIG. 22A is a schematic illustration of an exemplar luminance histogram. In FIG. 22A, the horizontal axis represents the luminance value (Y) while the vertical axis represents the number of pixels. To correct the image effect, it is necessary to determine the maximum value (Ymax), the minimum value (Ymin) and the peak value (Ypeak) as image effect correction parameters.

The maximum value is the value that shows the highest luminance value out of the luminance values having a count number greater than a predetermined number obtained by counting the number of pixels for each luminance value and the minimum value is the value that shows the lowest luminance value out of the luminance values having a count number greater than a predetermined number obtained by counting the number of pixels for each luminance value. The peak value is the luminance value where the largest count number. It is assumed that the peak value represents the luminance value of the background color of the original 4 that is the shooting target.

Figure 22B:
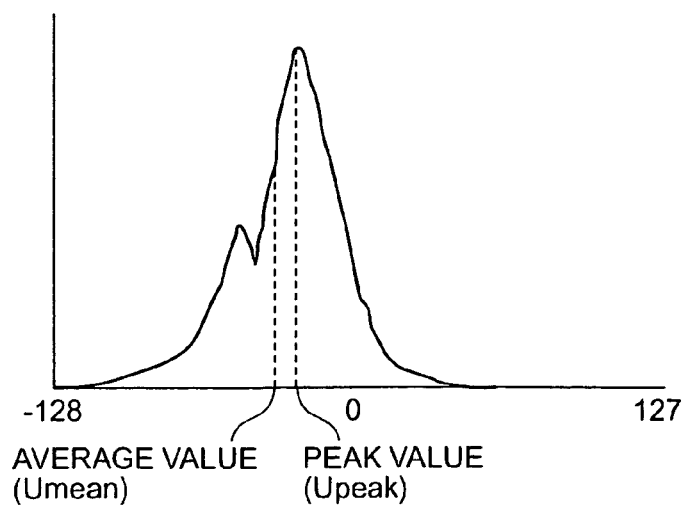

The color difference histogram shows the distribution of the color differences (U, V) found in the real original section and is generated by counting the number of pixels of the real original section for each color difference. FIG. 22B is a schematic illustration of an exemplar color difference histogram. In FIG. 22B, the horizontal axis represents the color difference and the vertical axis represents the number of pixels. In the case of a color difference histogram again, a peak value (Upeak, Vpeak) of color difference where the count number of pixels is maximum appears. It is also assumed that the peak value represents the color difference of the background color of the original 4. To correct the image effect, it is necessary to determine the peak value and the average value (Umean, Vmean) of the color difference histogram as image effect correction parameters. Note that the average value is the value of the color difference showing the average count number.

To acquire a visually excellent image by correcting the image effect, it is necessary to change image effect correction method by the background color of the original 4 because the correction effect varies as a function of the background color of the original 4. Therefore, it is necessary to determine the background color of the original 4. The background color of the original 4 is determined from the peak value of the luminance histogram and that of the color difference histogram.

The background color of the original 4 is of one of three categories. The first category is white. A white board or a notebook provides a white background color. The second category is black. A blackboard typically provides a black background color. The third category is other than white and black. A magazine or a pamphlet provides such a background color.

More specifically, the background color of the original 4 is determined by means of the determining equations shown below.

(2-a) Requirement for White Background Color

The requirement for white background color is expressed by an equation 21 below. When the requirement of the equation 21 is met, the background color or the original 4 is determined to be white (W).

$$\text{requirement for white} = (|\text{Upeak}| < \text{color threshold}) \ \& \ (|\text{Vpeak}| < \text{color threshold}) \ \& (\text{Ypeak} > \text{white determining value}) \quad \text{Equation 21}$$

(2-b) Requirement for Black Background Color

The requirement for black background color is expressed by an equation 22 below. When the requirement of the equation 22 is met, the background color of the original 4 is determined to be black (b).

$$\text{requirement for black} = (|\text{Upeak}| < \text{color threshold}) \ \& \ (|\text{Vpeak}| < \text{color threshold}) \ \& (\text{Ypeak} < \text{black determining value}) \quad \text{Equation 22}$$

When the requirements of the equations 21 and 22 are not met, the background color of the original 4 is determined to be a color (C) other than white and black. For example, 50 and 128 are selected for the color threshold and 128 is selected for the white determining threshold, while 50 is selected for the black determining threshold.

Figure 23:
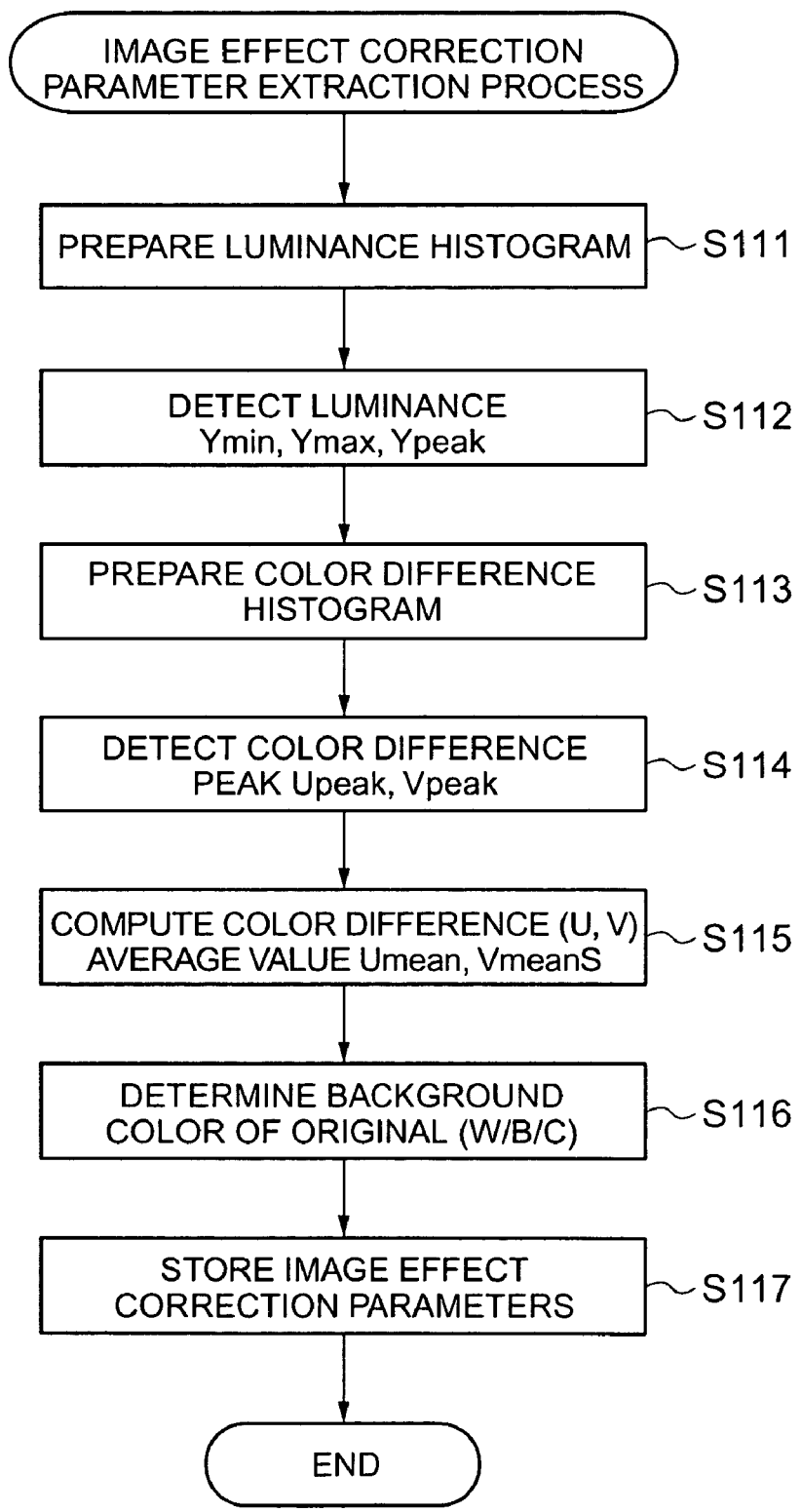
FIG. 23 is a flowchart of the image effect correction parameter extraction process to be executed by the image processing apparatus in FIG. 2.

On the basis of the above idea, the image processing apparatus 203 extracts image effect correction parameters, following the flowchart illustrated in FIG. 23.

The image processing apparatus 203 counts the number of pixels for each luminance (Y) value in the real original section and generates a luminance histogram as shown in FIG. 22A (step S111).

Then, the image processing apparatus 203 acquires the luminance maximum value (Ymax), the luminance minimum value (Ymin) and a luminance peak value (Ypeak) from the generated luminance histogram (step S112).

Then, the image processing apparatus 203 generates a color difference histogram for color differences (U, V) as shown in FIG. 22B (step S113).

Thereafter, the image processing apparatus 203 determines the peak values (Upeak, Vpeak) of the color differences (U, V) as image effect correction parameters (step S114).

Then, the image processing apparatus 203 determines the average values (U mean, V mean) of the color differences (U, V) as image effect correction parameters (step S115).

Then, the image processing apparatus 203 determines the background color of the original 4 from the peak values (Y peak, U peak, V peak) of the image histograms, using the background color determining requirement equations 21 and 22 (step S116).

Then, the image processing apparatus 203 stores the image effect correction parameters and the data on the background color of the original 4 in the memory 201 (step S1117).

Subsequently, the image processing apparatus 203 processes the image effect, using the image effect correction parameters that are extracted in the above-described manner (step S26 in FIG. 5).

As pointed out above, different processes need to be used for different background colors in order to effectively carry out an image effect process.

Figure 24A:
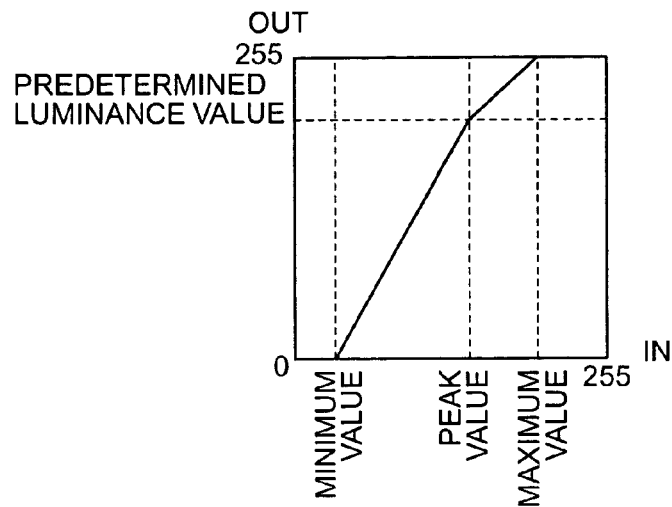
Figure 24B:
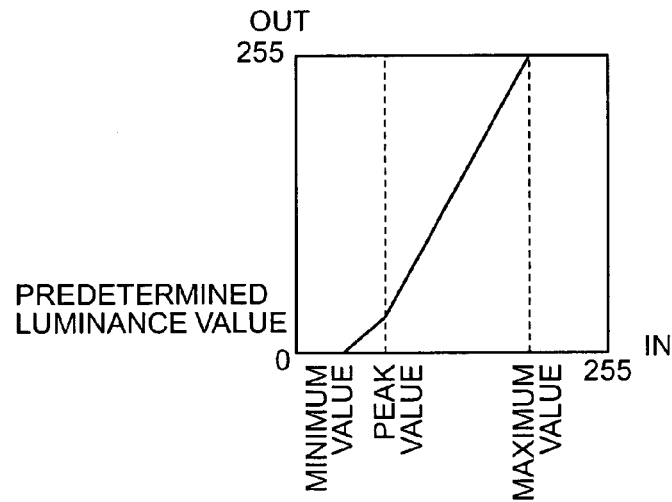
Figure 24C:
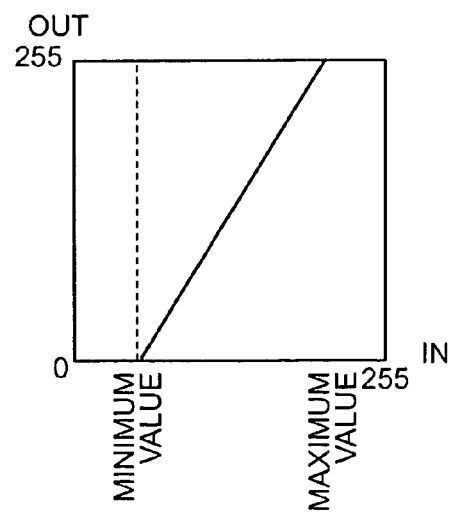
FIG. 24C is a schematic illustration of the image effect process to be executed when the background color is other than white and black.

When the background color is white as in the case of a white board or a note book, a luminance transformation as shown in FIG. 24A is carried out. When the background color is black as in the case of a blackboard, a luminance transformation as shown in FIG. 24B is carried out. When the background color is other than white and black as in the case of a magazine or a pamphlet, a luminance transformation as shown in FIGS. 24C is carried out. In FIGS. 24A, 24B and 24C, the horizontal axis represents the input pixel value and the vertical axis represents the output pixel value.

When the background color is white, the angle of inclination of the luminance transformation line is changed before and after the peak value as shown in FIG. 24A. For example, 230 is selected as predetermined luminance value and the input luminance peak value is raised to the luminance level of 230. Then, the maximum value is brought up to the maximum luminance value. Therefore, the luminance transformation line is expressed by two straight line segments as shown in FIG. 24A.

When the background color is black, a luminance transformation is carried out to bring the peak value to a predetermined luminance level (20) as shown in FIG. 24B. In this case again, the luminance transformation line is expressed by two straight line segments as shown in FIG. 24B.

When the background color is other than white and black, the part lower than the minimum value and the part higher than the maximum value are cut to define a luminance transformation line that is expressed by a single line segment as in the case of ordinary extension as shown in FIG. 24C.

A transformation table of the luminance (Y) of the background and the output (Y') may be prepared in advance and stored in the memory 201. Then, the output value of each pixel will be determined from the input pixel value by referring to the prepared transformation table and the image effect process will be executed. A light pixel becomes lighter and a dark pixel becomes darker in an image obtained by such a transformation process to broaden the luminance distribution and make the image more visually recognizable.

There can be cases where the picked-up image is entirely turned yellow, for example, to reveal that the white balance of the digital camera is not regulated properly. Such a color change cannot be corrected simply by carrying out an image effect process, using the luminance histogram.

Figure 25:
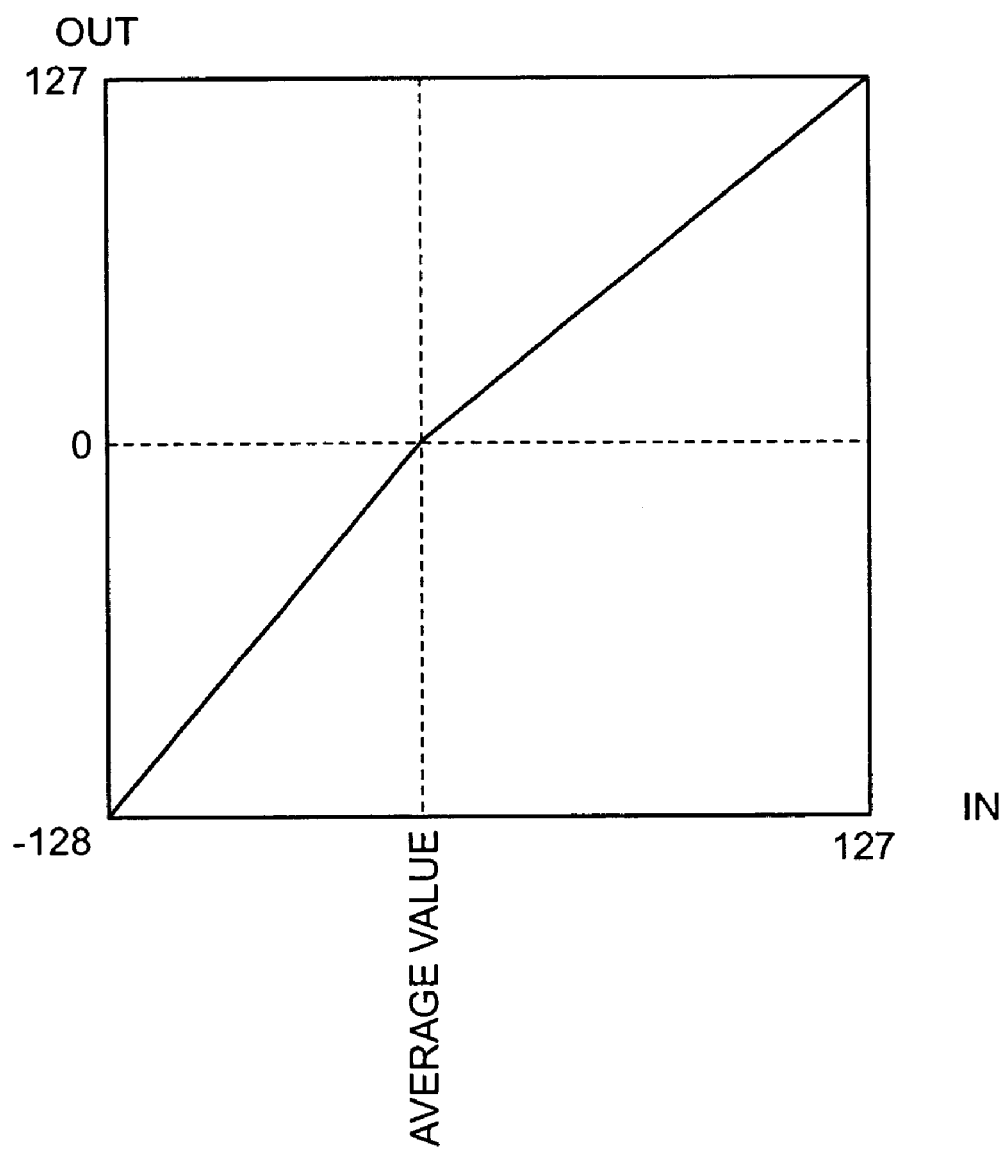
FIG. 25 is a schematic illustration of an exemplar luminance transformation graph to be used for color adjustment.

If such is the case, a color adjustment operation is conducted to obtain a desirable image. FIG. 25 is a schematic illustration of an exemplar luminance transformation graph to be used for color adjustment.

In FIG. 25, the horizontal axis represents the input color difference value and the vertical axis represents the output color difference value. For color adjustment, an operation of luminance transformation is conducted by referring to a luminance transformation graph as shown in FIG. 25 so as to make the average values (U mean, Vmean) of the color differences (U, V) shown in FIG. 22B equal to those of grey.

If the both color difference values U and V are equal to 0, there is no color in the image so that the color adjustment operation is conducted so as to make the both peak values (U peak, V peak) equal to 0. In other words, the color transformation line is defined by two line segments. The output value U' for the input value U is expressed by an equation 23 below.

$$U' = \frac{128}{(Umean + 128)} * (U - Umean) \quad (U < Umean)$$

$$U' = \frac{127}{(Umean + 127)} * (U - Umean) \quad (U \geq Umean)$$

Equation 23

A similar equation is used for the color difference V.

If the background color is not sufficiently whitened simply by extending the luminance in a manner as described above in the image effect process, the background color is whitened by making the color of the part that is taken for the background in the image show white (Y: 255, U: 0, V: 0) or a color close to white.

Figure 26A:
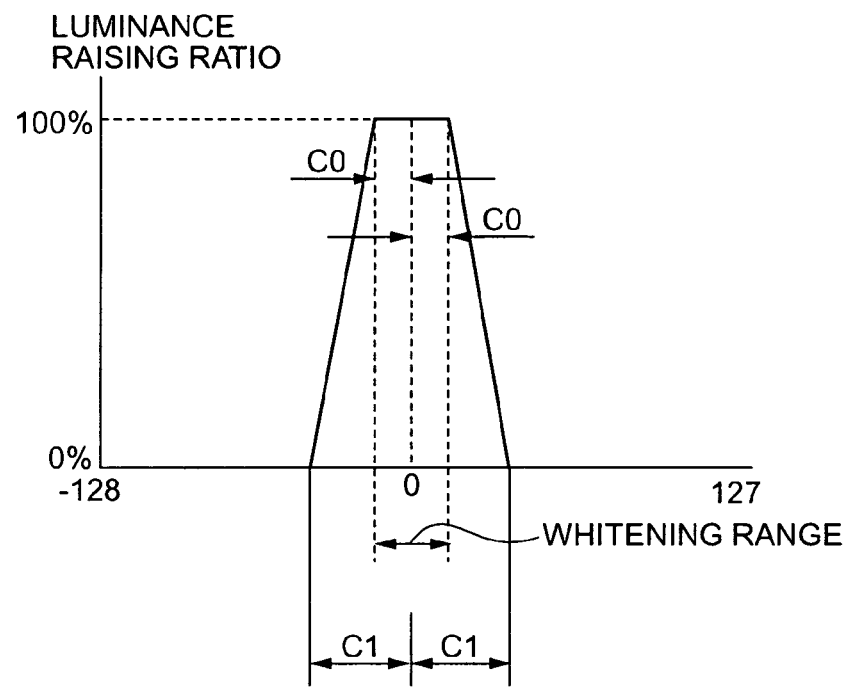
FIGS. 26A and 26B are schematic illustrations of whitening the background.
Figure 26B:
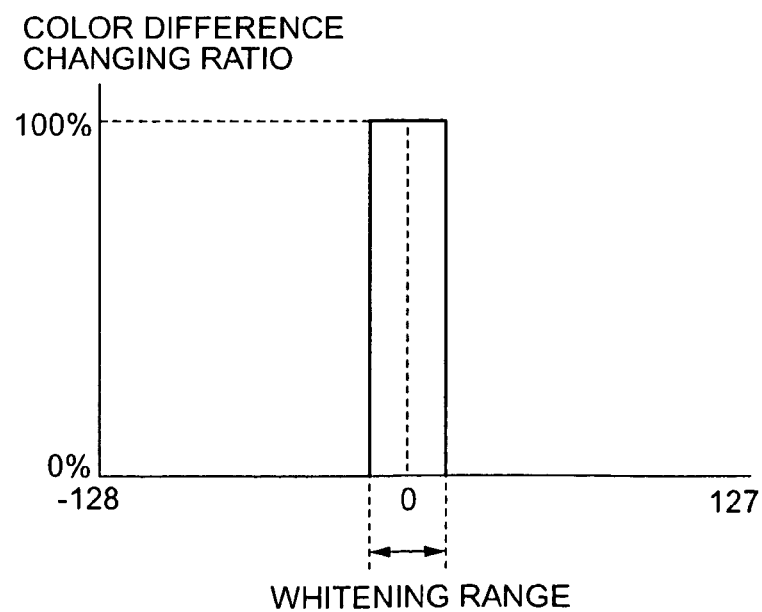

FIG. 26A is a graph illustrating the ratio by which the luminance value of a pixel is raised, using the luminance value of a pixel as reference (0). In FIG. 26A, the horizontal axis represents the luminance value and the vertical axis represents the ratio by which the luminance value is raised. FIG. 26B is a graph illustrating the relationship between the color difference and the color difference changing ratio. In FIG. 26B, the horizontal axis represents the color difference and the vertical axis represents the color difference changing ratio.

In FIG. 26A, C0 indicates the whitening range from 0 when the luminance and the color difference are raised by 100% and C1 indicates the range of changing the raising ratio as a function of the luminance value. As shown in FIGS. 26A and 26B, the color of each pixel whose luminance value (Y) is not smaller than a predetermined level (Y w) and whose dolor differences (U, V) are found within a predetermined range (C0) is regarded to be within the whitening range and its luminance value is raised and its color differences are made equal to 0. The image effect process is very effective by whitening the background in this way when the background is not sufficiently whitened by simply extending the luminance.

Figure 27:
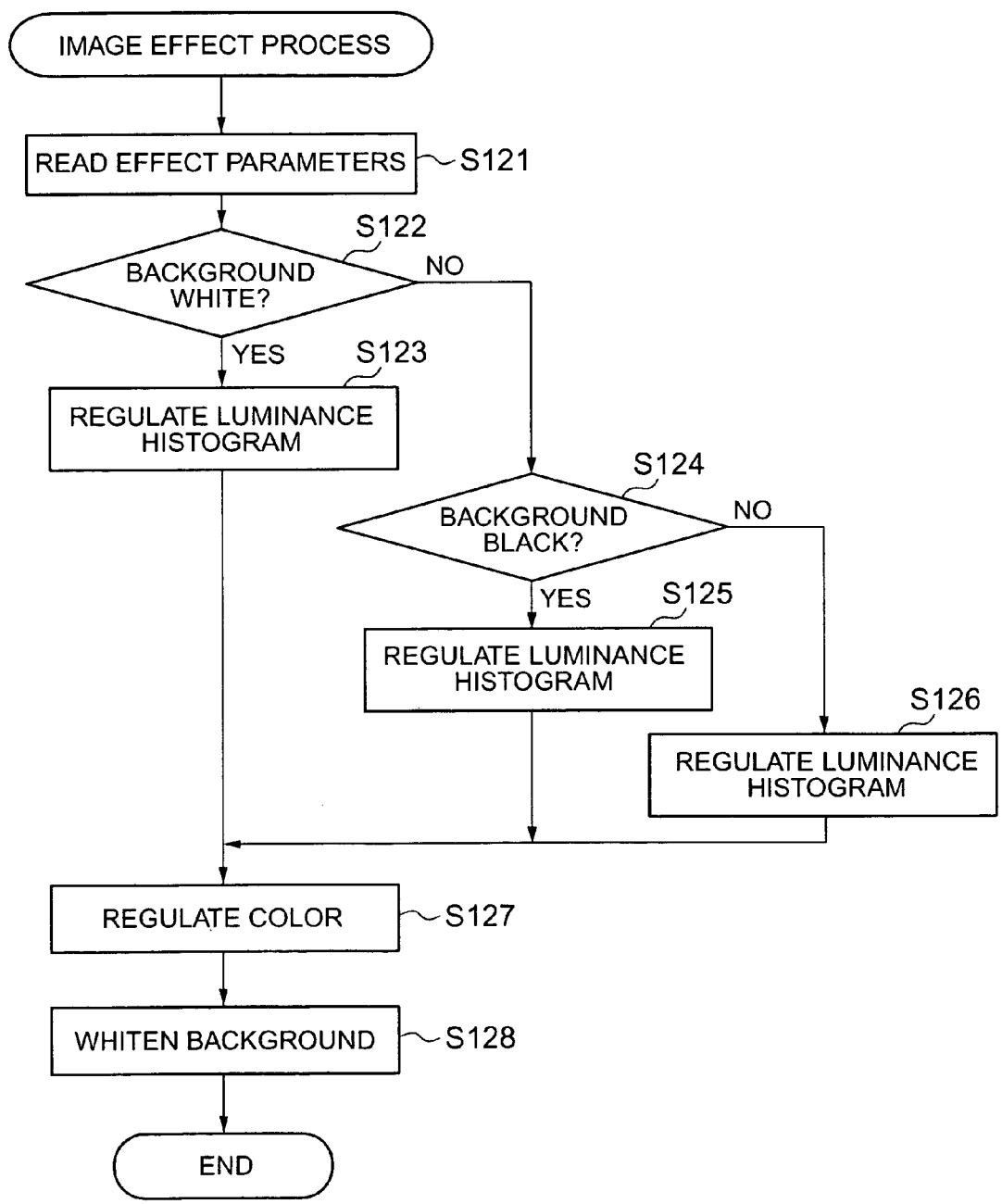
FIG. 27 is a flowchart of the image effect process to be executed by the image processing apparatus in FIG. 2.

Thus, on the basis of the above idea, the image processing apparatus 203 executes the image effect process, following the flowchart of FIG. 27.

Then, the image processing apparatus 203 reads out the stored image effect correction parameters from the memory 201 (step S121).

The image processing apparatus 203 determines if the background color is white or not (step S122).

If it is determined that the background color is white (YES at step S122), the image processing apparatus 203 operates for luminance transformation to regulate the luminance histogram in a manner as described above by referring to FIG. 24A in order to make the background whiter and more visible (step S123).

If, on the other hand, it is determined that the background color is not white (NO at step S122), the image processing apparatus 203 determines if the background color is black or not (Step S124).

If it is determined that the background color is black (YES at step S124), the image processing apparatus 203 operates for luminance transformation to regulate the luminance histogram in a manner as described above by referring to FIG. 24B (step S125).

If, on the other hand, it is determined that the background color is not black (NO at step S124), the image processing apparatus 203 operates for luminance transformation to regulate the luminance histogram that corresponds to the background color of the original 4 in a manner as described above by referring to FIG. 24C (step S126).

Then, the image processing apparatus 203 operates for transformation in a manner as described above by referring to FIG. 25 for color adjustment on the regulated image (step S127).

Figure 28:
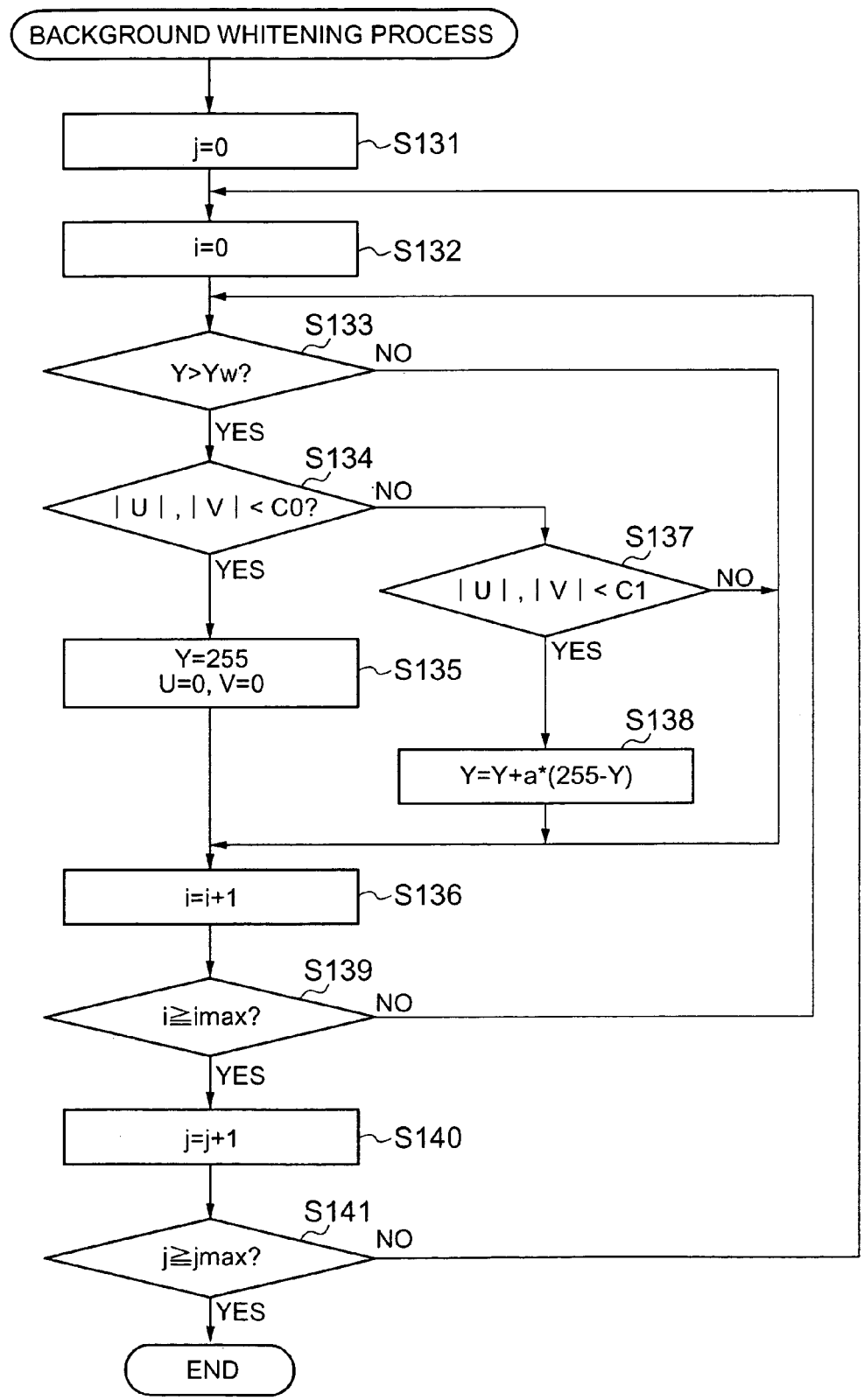
FIG. 28 is a flowchart of the background whitening process to be executed by the image processing apparatus in FIG. 2.

Then, the image processing apparatus 203 executes a whitening process (S128) for the background, following the flowchart of FIG. 28. In FIG. 28, i max and j max indicate the size of the x-axis and that of the y-axis of the input image respectively.

More specifically, the image processing apparatus 203 initializes the count value j to 0 (step S131).

Then, the image processing apparatus 203 initializes the count value i to 0 (step S132).

The image processing apparatus 203 determines if the luminance (Y) of the pixel (i,j) of the input image is not smaller than a predetermined value (Y w) or not (step S133).

If it is determined that the luminance (Y) is not smaller than the predetermined value (Y w) (YES at step S133), the image processing apparatus 203 determines if the absolute values of the color differences U, V are smaller than the predetermined value C0 or not (step S134).

If it is determined that the absolute values of the color differences U, V are smaller than the predetermined value C0 (YES at step S134), the image processing apparatus 203 selects 255 for the luminance value (Y) and 0 for the color differences (u, v) (S135), rewrites the value of the pixel (i,j) and increments the count value i by 1 (step S136).

If, on the other hand, it is determined that the absolute value of the color differences U, V are not smaller than the predetermined value C0 (NO at step S134), the image processing apparatus 203 determines if the absolute values of the color differences U, V of the pixel (i,j) of the input image are smaller than the predetermined value C1 or not (step S137).

If it is determined that the absolute values of the color differences U, V are smaller than the predetermined value C1 (YES at step S137), the image processing apparatus 203 makes the luminance Y=Y+a*(255−Y) (step S138), rewrites the value of the pixel (i,j) and increments the count value i by 1 (step S136).

If, on the other hand, it is determined that the absolute values of the color differences U, V are not smaller than the predetermined value C1 (NO at step S137), the image processing apparatus 203 increments the count value i by 1 without changing the luminance value (step S136).

Then, the image processing apparatus 203 compares the count value i with the maximum value i max and determines if the count value i gets to the maximum value i max or not (step S139).

If it is determined that the count value i does not get to the maximum value i max (NO at step S139), the image processing apparatus 203 repeats the process of steps S133 through S138 once again.

If it is determined that the count value i gets to the maximum value i max as a result of repeating the process of steps S133 through S138 (YES at step S139), the image processing apparatus 203 increments the count value j by 1 (step S140).

Then, the image processing apparatus 203 compares the count value j with the maximum value j max and determines if the count value gets to the maximum value j max or not (step S141).

If it is determined that the count value j does not get to the maximum value j max (NO at step S141), the image processing apparatus 203 repeats the process of steps S132 through S140 once again.

If it is determined that the count value j gets to the maximum value j max as a result of repeating the process of steps S132 through S140 (YES at step S141), the image processing apparatus 203 terminates the background whitening process.

(4) Regulation of Image Transformation

Now, the operation of regulating the image, which is transformed once (step S33 in FIG. 5), will be described below.

Figure 29A:
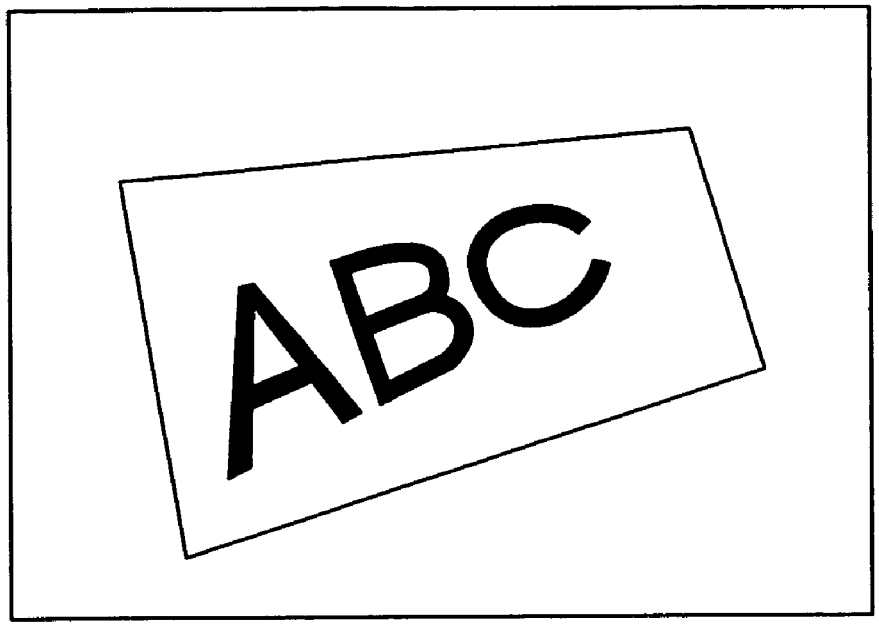
FIGS. 29A and 29B are schematic illustrations of an exemplar image for which the image distortion cannot be corrected by projective transformation.
Figure 29B:
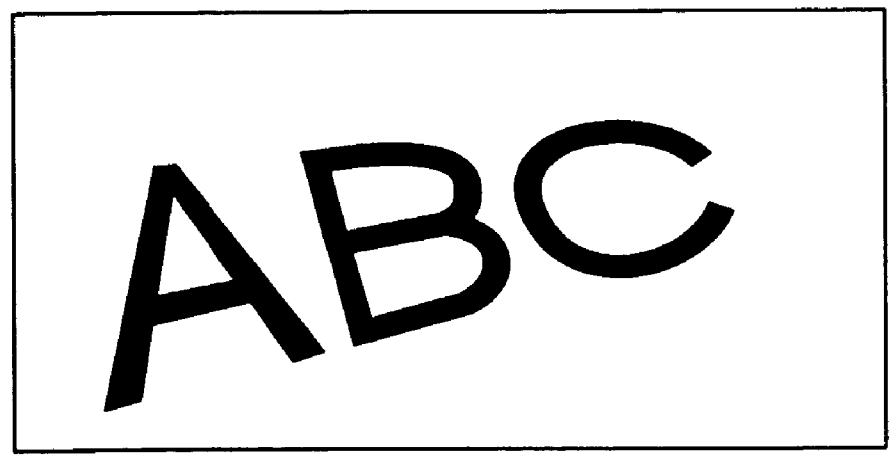

If the coordinates of the extracted corners of a quadrangle contain slight errors, there can be cases where the image projected by using the acquired affine parameters is not satisfactory as shown in FIGS. 29A and 29B. In view of this problem, the imaging/image projection apparatus of this embodiment is adapted such that the user can regulate the obtained projection transformation.

As the user operates any of the keys of the operation unit 204, the operation unit 204 transmits information on the user operation to the CPU 206 as command information in response to the operation. Then, the CPU 206 recognizes the information on the user operation and controls the image processing apparatus 203 according to its recognition.

Figure 30:
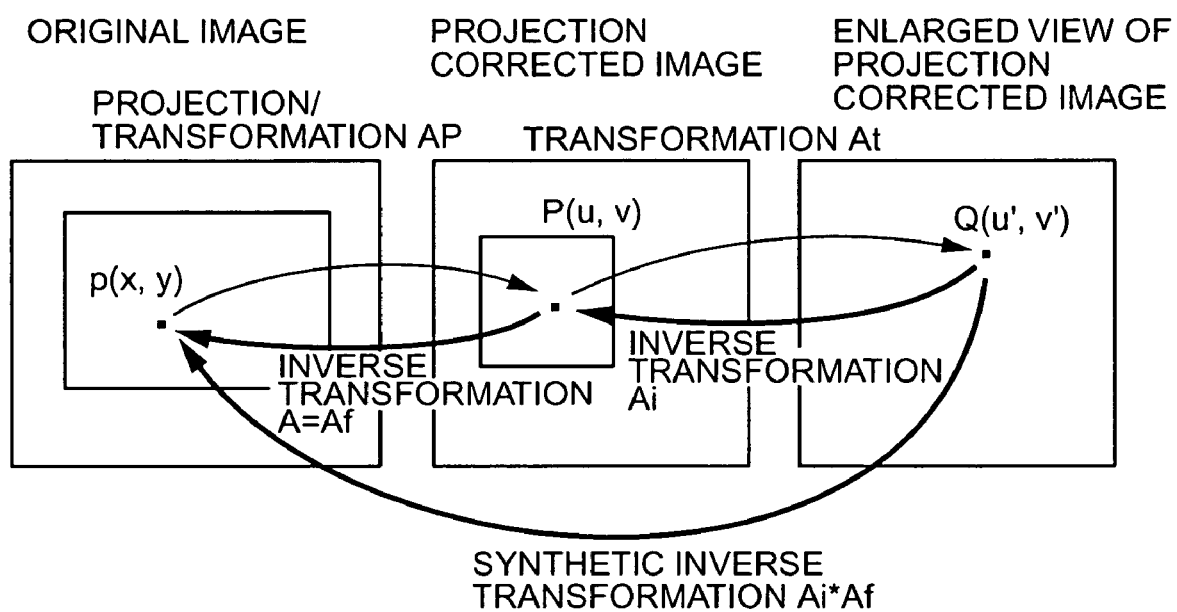
FIG. 30 is a schematic illustration of the corresponding relationship of the original image, the image obtained after projective transformation and an enlarged image obtained after projective transformation.

When determining interpolated pixel Q(u',v') for the corrected image as shown in FIG. 30, it is a common practice that the interpolated pixel Q(u',v') is further subjected to inverse transformation Ai to determine corrected image P(u,v) that corresponds to the interpolated pixel Q(u',v') and the corrected image P(u,v) is by turn subjected to inverse transformation to determine p(x,y) of the original image so as to perform an operation of pixel interpolation on the image p(x,y). For two-stage image transformation such as projection transformation and enlargement transformation, a transformation matrix of two transformations is synthetically determined and the transformations are conducted at a time relative to the original image. This is a way for determining an image that is faster and less subject to image degradation than the above-described method of forming an image by carrying out inverse transformation twice.

The rotary inverse transformation matrix Ar for acquiring the pre-transformation image from the post-transformation image obtained by rotating the pre-transformation image by angle θ, using X-axis and Y-axis as center of rotation, is expressed by an equation 24 below.

$$Ar = \begin{bmatrix} \cos\theta & -\sin\theta & 0 \\ \sin\theta & \cos\theta & 0 \\ -Xc\cos\theta - Yc\sin\theta + Xc & Xc\sin\theta - Yc\cos\theta + Yc & 1 \end{bmatrix} \quad \text{Equation 24}$$

The enlargement matrix Asc for acquiring the pre-transformation image from the post-transformation image obtained by enlarging the pre-transformation image by Sc times, using X-axis and Y-axis as center of enlargement, is expressed by an equation 25 below.

$$Asc = \begin{bmatrix} 1/Sc & 0 & 0 \\ 0 & 1/Sc & 0 \\ Xc\left(1 - \frac{1}{Sc}\right) & Yc\left(1 - \frac{1}{Sc}\right) & 1 \end{bmatrix} \quad \text{Equation 25}$$

Note that, once an image is enlarged, sometimes it may be necessary to process the rounding errors, if any, when regulating the affine parameters and performing computations by using them. Therefore, when enlarging an image, it is necessary to allow the affine parameters to restore the original size before the enlargement.

The displacement matrix As for acquiring the pre-transformation image from the post-transformation image obtained by displacing the pre-transformation image by Tx and Ty in the X- and Y-directions respectively is expressed by an equation 26 below.

$$As = \begin{bmatrix} 1 & 0 & 0 \\ 0 & 1 & 0 \\ -Tx & -Ty & 1 \end{bmatrix} \quad \text{Equation 26}$$

The projection effect matrix Ap for acquiring the pre-transformation image from the post-transformation image obtained by inclining the pre-transformation image by α and β in the X- and Y-directions respectively is expressed by an equation 27 below.

$$Ap = \begin{bmatrix} 1 & 0 & \alpha \\ 0 & 1 & \beta \\ 0 & 0 & 1 \end{bmatrix} \quad \text{Equation 27}$$

The inverse transformation matrix A for two-stage inverse transformation is expressed by an equation 28 below.

$$A = Ai(2)*Ai(1) \quad \text{Equation 28}$$

Figure 31:
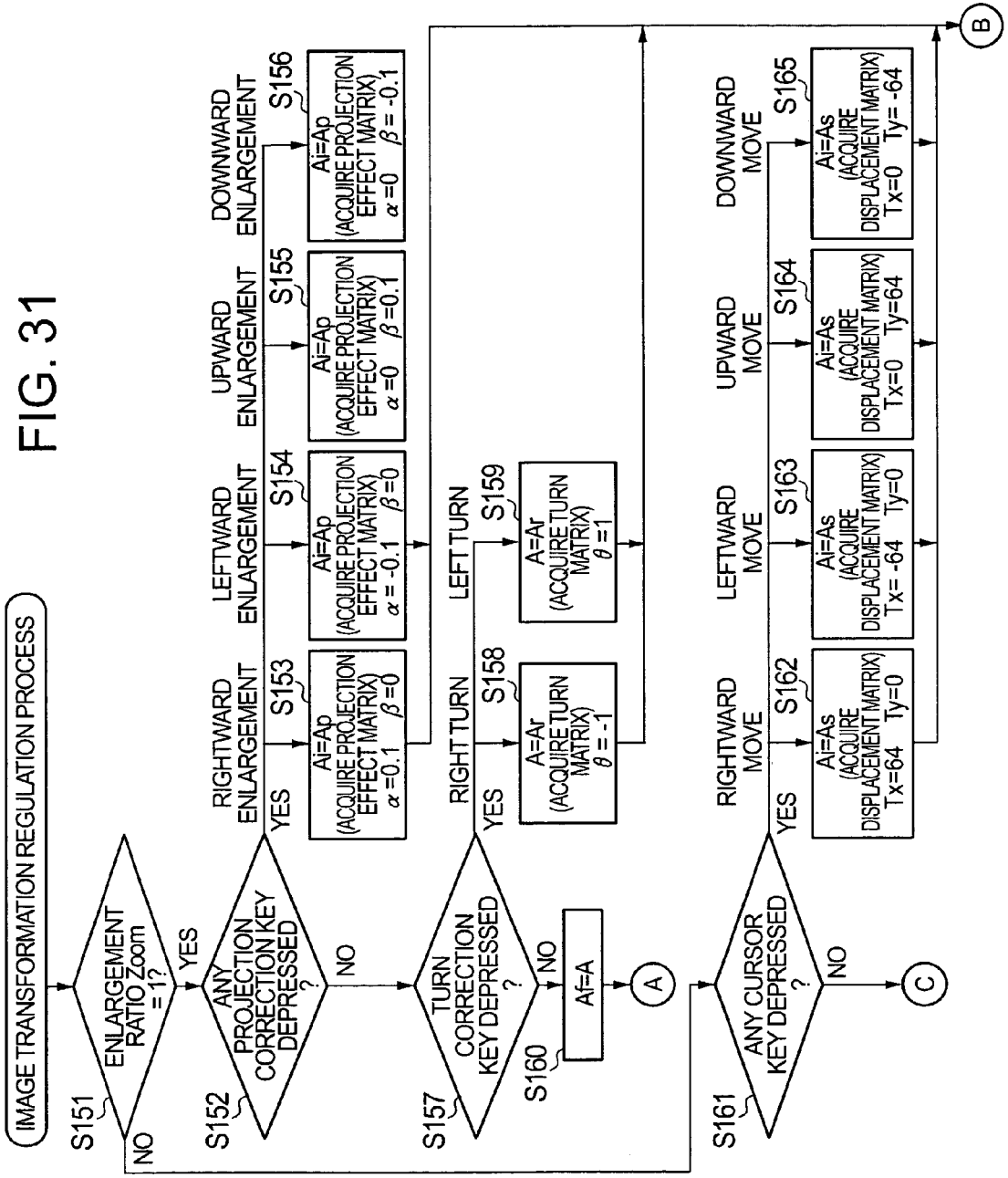
FIG. 31 is a former half of a flowchart of the correction adjustment and image transformation process to be executed by the image processing apparatus in FIG. 2.
Figure 32:
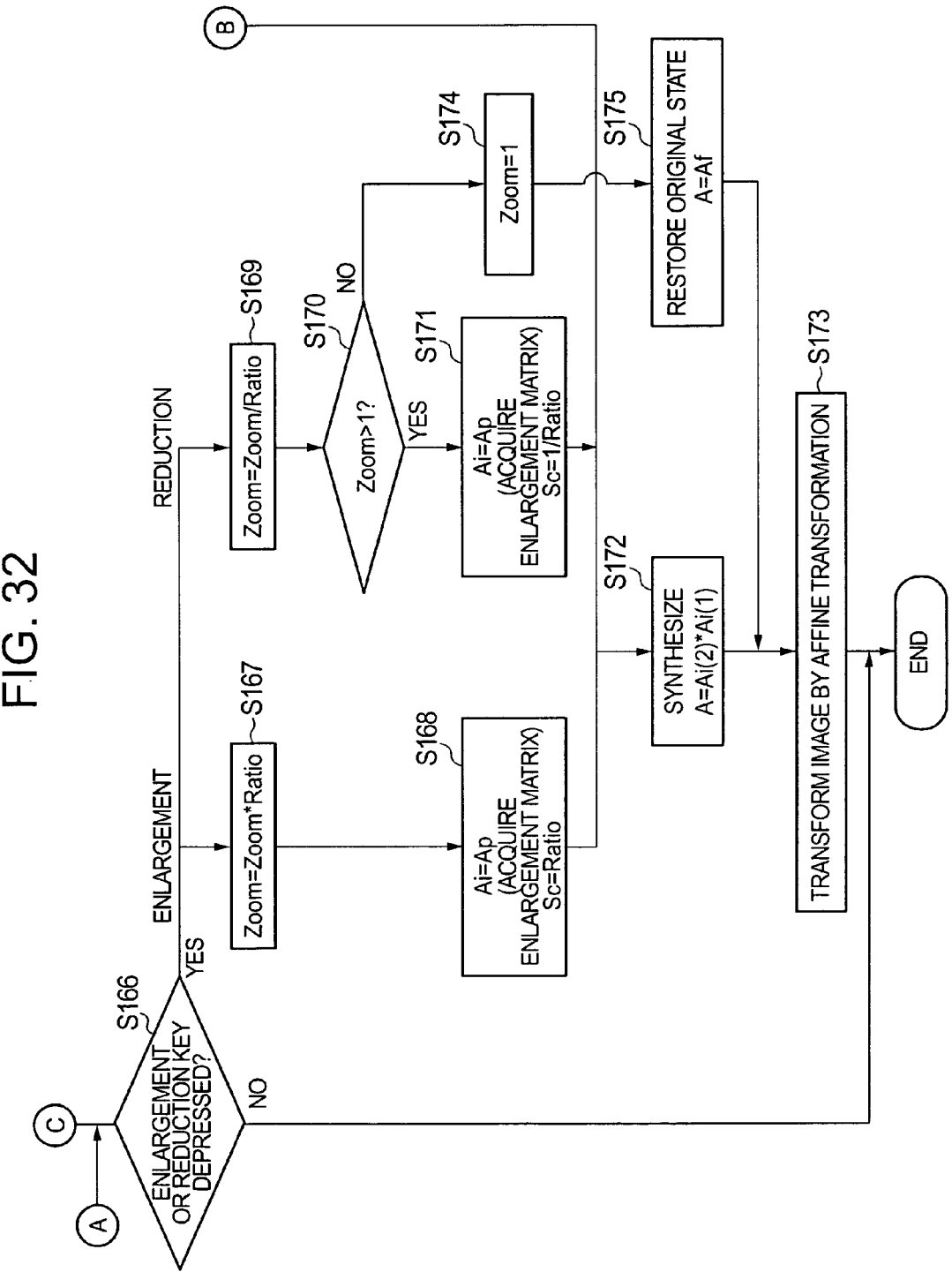
FIG. 32 is a latter half of a flowchart of the correction adjustment and image transformation process to be executed by the image processing apparatus in FIG. 2.

The image transformation regulating operation that is conducted on the basis of the above-described idea will be described by referring to the flowchart of FIG. 31.

The CPU 206 determines if the enlargement ratio Zoom is equal to 1 or not (step S151). The CPU 206 at first determines that the enlargement ratio Zoom is equal to 1 because the enlargement ratio Zoom is initialized to 1 in advance. If it is determined that the enlargement ratio Zoom is equal to 1 (YES at step S151), the CPU 206 determines if any of the upper enlarging key 211, the lower enlarging key 212, the left enlarging key 213 and the right enlarging key 214 is depressed as one of the projection transformation keys or not (step S152).

If it is determined that one of the projection transformation keys is depressed (YES at step S152), the CPU 206 identifies the operated projection transformation key.

If it is determined that the depressed projection transformation key is the right enlarging key 214, the CPU 206 substitutes $\alpha=0.1$ and $\beta=0$ of the projection effect matrix Ap of the equation 27 to acquire the inverse transformation matrix Ai=Ap (step S153).

If it is determined that the depressed projection transformation key is the left enlarging key 213, the CPU 206 substitutes $\alpha=-0.1$ and $\beta=0$ of the projection effect matrix Ap of the equation 27 to acquire the inverse transformation matrix Ai=Ap (step S154).

If it is determined that the depressed projection transformation key is the upper enlarging key 211, the CPU 206 substitutes $\alpha=0$ and $\beta=0.1$ of the projection effect matrix Ap of the equation 27 to acquire the inverse transformation matrix Ai=Ap (step S155).

If it is determined that the depressed projection transformation key is the lower enlarging key 212, the CPU 206 substitutes $\alpha=0$ and $\beta=-0.1$ of the projection effect matrix Ap of the equation 27 to acquire the inverse transformation matrix Ai=Ap (step S156).

If it is determined that none of the projection transformation keys is depressed (NO at step S152), the CPU 206 determines if any of the rotation keys is depressed or not (step S157).

If it is determined that one of the rotation keys is depressed (YES at step S157), the CPU 206 identifies the depressed rotation key.

If it is determined that the depressed rotation key is the right rotation key 215, the CPU 206 substitutes $\theta=-1$ of the rotary inverse transformation matrix Ar of the equation 24 to acquire the inverse transformation matrix Ai=Ar (step S158).

If it is determined that the depressed rotation key is the left rotation key 216, the CPU 206 substitutes $\theta=1$ of the rotary inverse transformation matrix Ar of the equation 24 to acquire the inverse transformation matrix Ai=Ar (step S159).

If it is determined that none of the rotation keys is depressed (NO at step S157), the CPU 206 saves the current affine parameters in the matrix Af so as to allow the affine parameters to restore the original size before the enlarging process (step S160).

If, on the other hand, it is determined that the enlargement ratio Zoom is not equal to 1 (NO at step S151), the CPU 206 determines if any of the cursor keys is depressed or not (step S161).

If it is determined that one of the cursor keys is depressed (YES at step S161), the CPU 206 identifies the depressed cursor key.

If it is determined that the depressed cursor key is the rightward moving key (the enlarging key 217 and the right enlarging key 214), the CPU 206 substitutes the quantities of displacement Tx=64 and Ty=0 of the X-axis and the Y-axis respectively of the displacement matrix As of the equation 26 and acquires the inverse transformation matrix Ai=As (step S162).

If it is determined that the depressed cursor key is the leftward moving key (the enlarging key 217 and the left enlarging key 213), the CPU 206 substitutes the quantities of displacement Tx=−64 and Ty=0 of the X-axis and the Y-axis respectively of the displacement matrix As of the equation 26 and acquires the inverse transformation matrix Ai=As (step S163).

If it is determined that the depressed cursor key is the upward moving key (the enlarging key 217 and the upper enlarging key 211), the CPU 206 substitutes the quantities of displacement Tx=0 and Ty=64 of the X-axis and the Y-axis respectively of the displacement matrix As of the equation 26 and acquires the inverse transformation matrix Ai=As (step S164).

If it is determined that the depressed cursor key is the downward moving key (the enlarging key 217 and the lower enlarging key 212), the CPU 206 substitutes the quantities of displacement Tx=0, Ty=−64 of the X-axis and the Y-axis respectively of the displacement matrix As of the equation 26 and acquires the inverse transformation matrix Ai=As (step S165).

On the other hand, if it is determined that no cursor key is depressed (NO at step S161) or if it is determined that no rotation correction key is depressed and the current affine parameters are saved in the matrix Af(step S160), the CPU 206 determines if either the enlarging key 217 or the reducing key 218 is depressed or not (step S166).

If it is determined that neither the enlarging key 217 nor the reducing key 218 is depressed (NO at step S166), the CPU 206 terminates the image transformation regulating process.

On the other hand, if it is determined that either the enlarging key 217 or the reducing key 218 is depressed (YES at step S166), the CPU 206 identifies the depressed key.

If it is determined that the depressed key is the enlarging key 217, the CPU 206 acquires a new enlargement ratio Zoom as enlargement ratio Zoom=Zoom*Ratio (Ratio being 2, for example) (step S167) and substitutes Sc=Ratio for Sc in the enlargement matrix Asc of the equation 25 to acquire the inverse transformation matrix Ai=Ap (step S168).

On the other hand, if it is determined that the depressed key is the reducing key 218, the CPU 206 acquires a new enlargement ratio Zoom as reduction ratio Zoom=Zoom/Ratio (step S169).

In the case where the reducing key 218 is depressed, the CPU 206 determines if the enlargement ratio Zoom exceeds 1 or not (step S170).

If it is determined that the enlargement ratio Zoom exceeds 1 (Zoom>1) (YES at step S170), the CPU 206 substitutes Sc=1/Ratio for Sc in the enlargement matrix Asc of the equation 25 and acquires the inverse transformation matrix Ai=Ap (step S171).

If the inverse transformation matrix Ai is specified (steps S153 through 156, S158, S159, S162 through S165, S168, S171), the CPU 206 determines the inverse transformation matrix A, using the equation 28 (step S172).

Then, the CPU 206 supplies the determined transformation matrix A to the image processing apparatus 203 and controls the image processing apparatus 203 so as to execute an image transformation process according to the inverse transformation matrix A. Then, the image processing apparatus 203 executes the image transformation process by affine transformation according to the supplied inverse transformation matrix A (step S173).

On the other hand, if it is determined that the enlargement ratio Zoom does not exceed 1 (Zoom≦1) (NO at step S170), the CPU 206 defines the enlargement ratio Zoom=1 (step S174).

Then, the CPU 206 restores the original transformation matrix A, using A=Af (the affine parameters saved at step S160 before the enlargement process) (step S175).

Thus, the CPU 206 similarly supplies the determined inverse transformation matrix A to the image processing apparatus 203 and controls the image processing apparatus 203 so as to execute an image transformation process by affine transformation according to the supplied inverse transformation matrix A (step S173).

The image prepared by enlargement or some other process is part of the original 4. In many cases, such an enlarged original 4 that is to be used for a lecture or the like contains one or more than one graphs and/or one or more than one pictures and, if an image effect process of extending the contrast or the like is executed by using only the enlarged part, there may be occasions where it is not possible to achieve the expected image quality. This is because the ratio of the background color is small if the original 4 contains one or more than one graphs and/or one or more than one pictures.

Therefore, it is preferable to use the image effect correction parameters obtained before such image transformation without modifying them when the image is to be enlarged, reduced or moved. For this reason, if the image transformation is image enlargement, image reduction, image displacement or the like at step S33 (image transformation) of FIG. 5, the CPU 206 skips the step of extracting image effect correction parameters and the image processing apparatus 203 operates for the image effect process, using the image effect correction parameters before the image transformation.

If, on the other hand, the image transformation is image projection transformation, image rotation or the like, the transformation process can be executed without problem even when the shooting target (original 4) is not cut out properly so that it is preferable to newly extract image effect correction parameters from the newly prepared image obtained by such image transformation. For this reason, if the image transformation is image projection transformation, image rotation or the like, the CPU 206 moves to the process of extracting image effect correction parameters (step S25 in FIG. 5).

As described above, with this embodiment 1, the image processing apparatus 203 acquires the contour of the image of the original 4 and also the shape of the quadrangle of the original 4 and then executes an operation of projection transformation of the image of the original 4 by determining the projection parameters from the positions of the corners of the quadrangle.

Therefore, if the original 4 that is the shooting target is a quadrangle, the embodiment 1 automatically cuts out an image of the original 4 and transforms it to a proper square image. Thus, it is not necessary to shoot the shooting target from right above and it is possible to project the image of the original 4 in the right direction on the screen 3 regardless of the direction in which the original 4 is placed.

Additionally, since the cut-out image is subjected to an optimal image effect process, it is possible to acquire a highly readable image even if the original 4 is not illuminated.

Still additionally, when the cut-out image is corrected by rotating the image and/or subjecting it to a projection effect process, the image effect correction parameters obtained at the first cutting out operation are used so that it is possible to prepare a clearly visible image with ease. Thus, if the original 4 is warped or bent, the obtained image can be regulated by processing the image with a simple operation.

Furthermore, since the cut-out image can be enlarged, reduced or subjected to a similar operation and the final image is acquired not from the cut out image but by way of image transformation where the original image is cut out and enlarged simultaneously, it is possible to prepare an image that is least degraded.

Finally, when an enlarged image of the cut-out image is subjected to an image effect process, the image effect correction parameters obtained before the enlargement are stored and used for the image effect process so that it is possible to acquire a high quality image on a stable basis.

Embodiment 2

Embodiment 2 of the present invention, which is an imaging/image projection apparatus, is provided with a computer, which operates for processing images.

Figure 33:
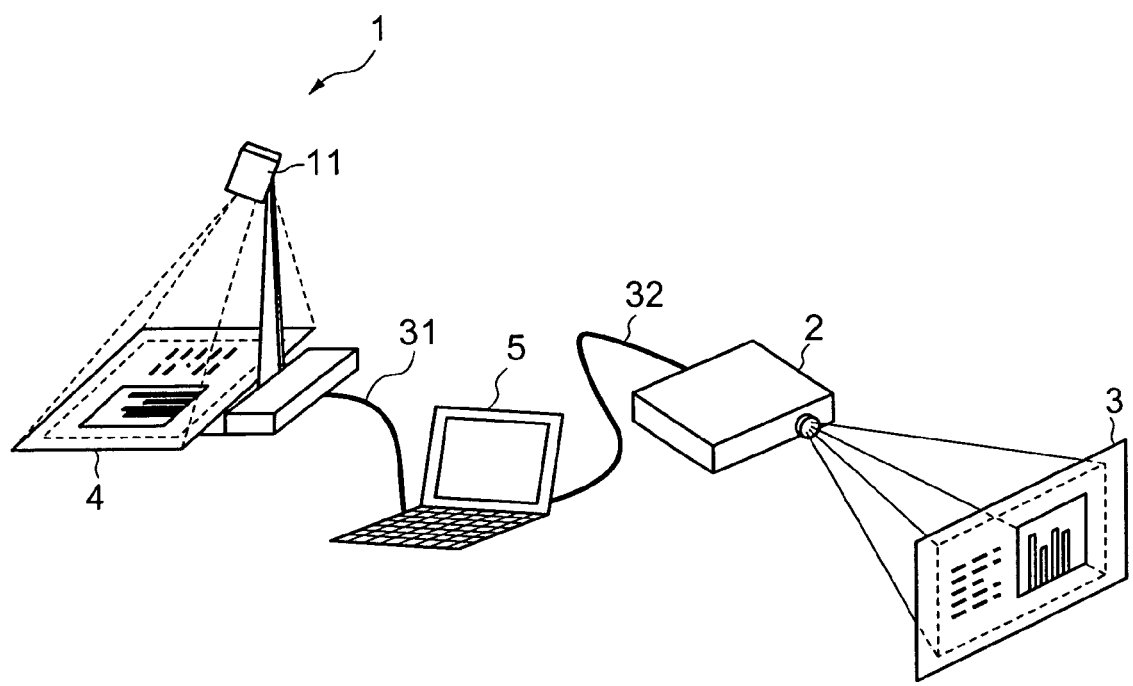
FIG. 33 is a schematic illustration of Embodiment 2 of the present invention, which is an imaging/image projection apparatus.
Figure 34:
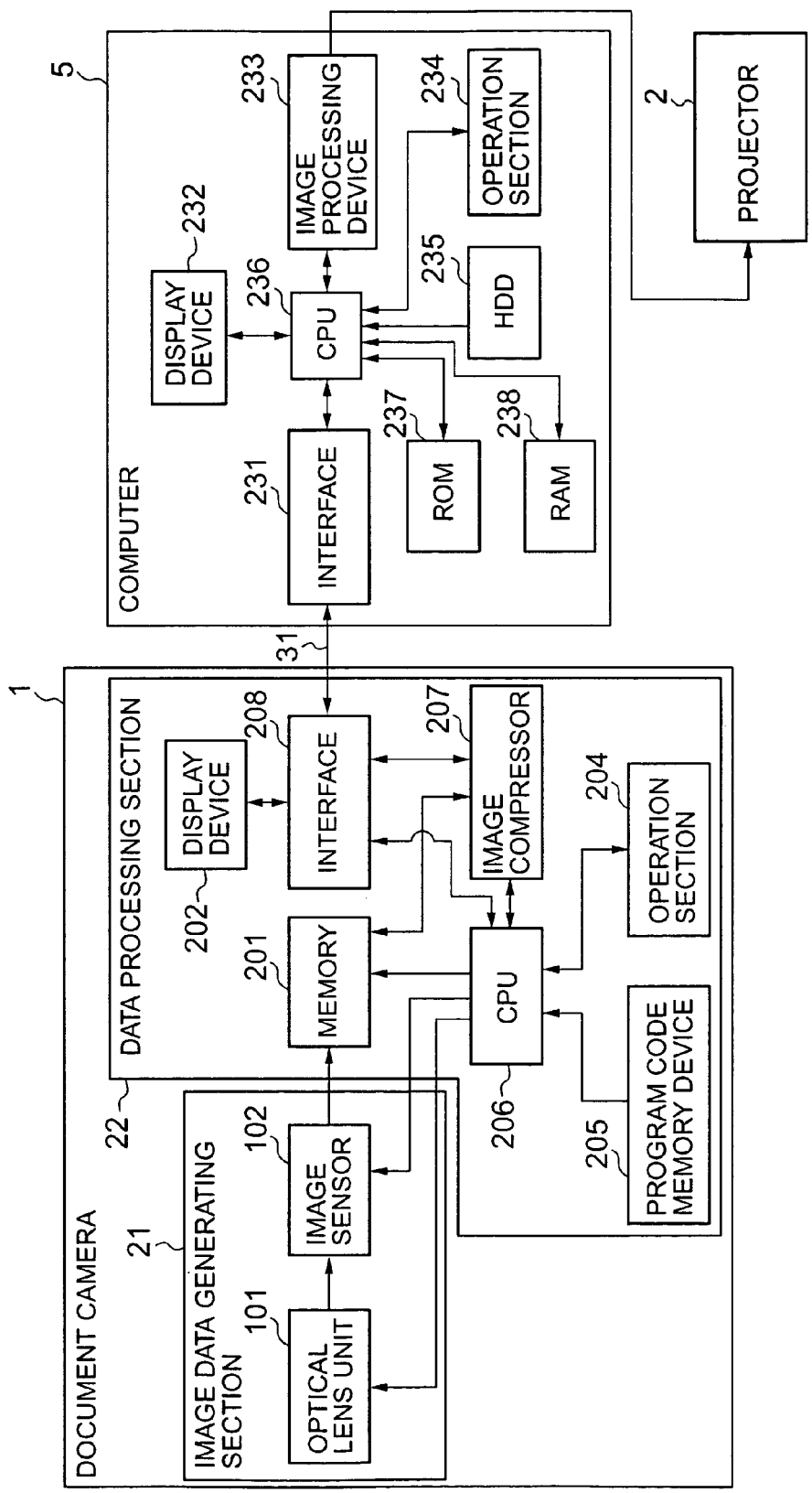
FIG. 34 is a schematic block diagram of the document camera in FIG. 33, illustrating the configuration thereof.

FIG. 33 is a schematic illustration of Embodiment 2 of the present invention, which is an imaging/image projection apparatus.

The imaging/image projection apparatus of Embodiment 2 comprises a computer 5 in addition to a document camera 1 and a projector 2.

The document camera 1 and the computer 5 are connected to each other by way of a communication cable 31 such as USB (Universal Serial Bus) and the computer 5 and the projector 2 are connected to each other by way of a video cable 32 such as RGB cable.

The document camera 1 of Embodiment 2 comprises an image compressor 207, an interface 208 and a data processing unit 22 in place of the image processing apparatus 203 of Embodiment 1

The image compressor 207 compresses the image data in order to reduce the amount of data to be transmitted to the computer 5. The image compressor 207 compresses still images, using techniques conforming to the JPEG (Joint Photographic Expert Group) Standards or the like.

The interface 208 is used to transmit compressed image data to the computer 5 and receive an imaging command from the computer 5.

The CPU 206 has the functional feature of initializing the camera specifying parameters such as the focal point, the exposure and the white balance of the optical lens section 101 to the movie mode. With this arrangement, the scene taken by the camera section 11 is converged to the image sensor 102 by way of the optical lens section 101 and the image sensor 102 prepares image data for a low resolution digital image as movie data from the image of the converged light. Then, the image sensor 102 transmits the prepared digital image data periodically to the memory 201 typically at a rate of 30 frames per second.

The computer 5 controls the document camera 1 so as to send an imaging command to the document camera 1 and receives image data, which are to be processed and transmitted to the projector 2.

The computer 5 has an interface 231, a display device 232, an image processing apparatus 233, an operation unit 234, an HDD (Hard Disk Drive) 235, a CPU 236, a ROM (Read Only Memory) 237 and a RAM (Random Access Memory) 238.

The interface 231 is used to receive compressed image data and transit imaging commands and the like.

Like the display device 202 of Embodiment 1, the display device 232 is used to display the image to be transmitted to the projector 2.

The image processing apparatus 233 corrects the distortion of the image of the received image data and performs image processes including image effect processes. In short, it operates like the image processing apparatus 203 of Embodiment 1. Additionally, the image processing apparatus 233 generates non-compression data by compression-decoding the compressed image.

The image processing apparatus 233 may be realized by hardware or by software. However, it is preferable to realize the image processing apparatus 233 by software because the functional features of the image processing apparatus 233 can be updated by version ups.

Since the computer 5 is provided with the functional features of the image processing apparatus 203 of the document camera 1 of Embodiment 1, it is no longer necessary to mount hardware for image processing on the camera section 11 so that it is possible to use a commercially available standard digital camera.

The operation unit 234 has switches and keys that the user uses to input data and commands.

The HDD 235 stores data. The HDD 235 also stores the software for processing images/pictures that is installed in advance.

The CPU 236 controls the components of the computer 5 and also the document camera 1 by transmitting an imaging command for picking up a high resolution still image to the document camera 1.

The ROM 237 stores the basic program codes that the CPU 236 executes.

The RAM 238 stores data necessary for the CPU 236 to execute program.

Now, the operation of the imaging/image projection apparatus of Embodiment 2 will be described below by referring to the flowchart of FIG. 35.

Firstly, the CPU 206 of the document camera 1 initializes the interface 208, the image compressor 207 and the working memory in the memory 201 (step S201).

Then, the CPU 206 also initializes the camera defining parameters including those of the focal point, the exposure, the white balance of the optical lens section 101 of the document camera 11 to the movie mode (step S202).

Thereafter, the CPU 206 checks the interface 208 to determine if the latter receives an imaging command from the computer 5 or not (step S203).

If it is determined that no imaging command is received (NO at step S203), the CPU 206 determines if any of the image regulation keys of the operation unit 204 is depressed or not according to the operation information from the operation unit 204 (step S204).

If it is determined that one of the image regulation keys is depressed (YES at step S204), the CPU 206 transmits information identifying the depressed image regulation key to the computer 5 by way of the interface 208 (step S205) and reads a low resolution image from the image sensor 102 (step S206).

If, on the other hand, it is determined that none of the image regulation keys is depressed (NO at step S204), the CPU 206 does not transmit any identification information and reads a low resolution image from the image sensor 102 (step S206).

The image compressor 207 compresses the image data that the CPU 206 read under the control of the CPU 206 (step S207).

Then, the CPU 206 transmits the data of the low resolution image compressed by the image compressor 207 to the computer 5 by way of the interface 208 typically at a rate of 30 frames per second (step S208).

Then, the CPU 206 and the image compressor 207 repeat the process of steps S203 through S208. In this way, the document camera 1 periodically transmits a low resolution image to the computer 5 unless it receives an imaging command.

If it is determined that an imaging command is received (YES at step S203), the CPU 206 selects the high resolution still mode for the imaging mode of the image sensor 102 and that of the optical lens section 101 (step S209).

Then, the CPU 206 controls the camera section 11 so as to pick up a high resolution stationary image (step S210).

The CPU 206 transmits the image data of the image picked up by the camera section 11 to the image compressor 207. The image compressor 207 by turn compresses the received image data (step S211).

The image compressor 207 transmits the compressed image data of the high resolution stationary image to the computer 5 by way of the interface 208 (step S212).

Then, the CPU 206 selects the low resolution movie mode (step S213). It then repeats the process of steps S203 through S208 until it receives an imaging command and transmits the acquired low resolution image to the computer 5 by way of the interface 208.

Figure 35:
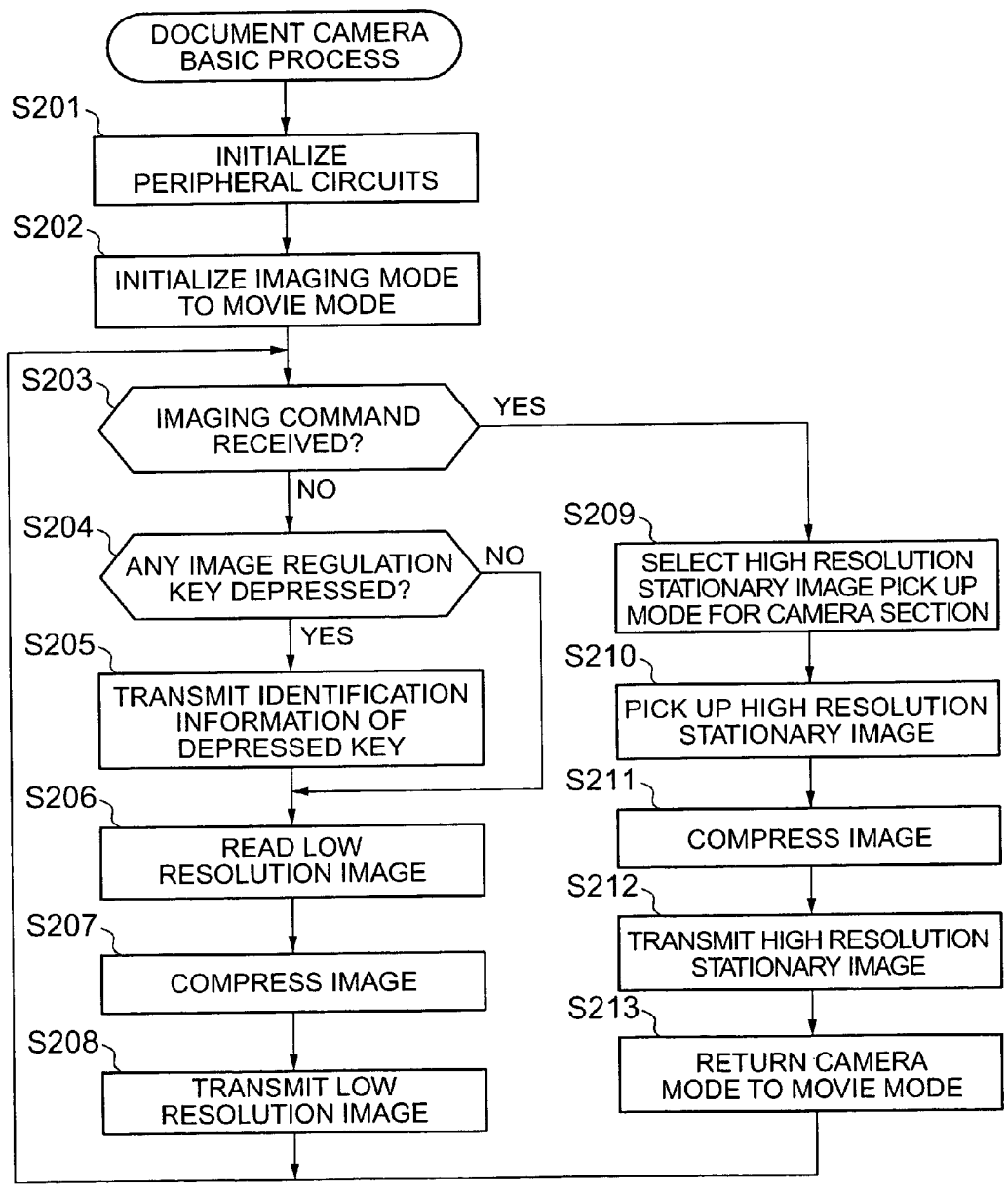
FIG. 35 is a flowchart of the basic process to be executed by the document camera in FIG. 34.
Figure 36:
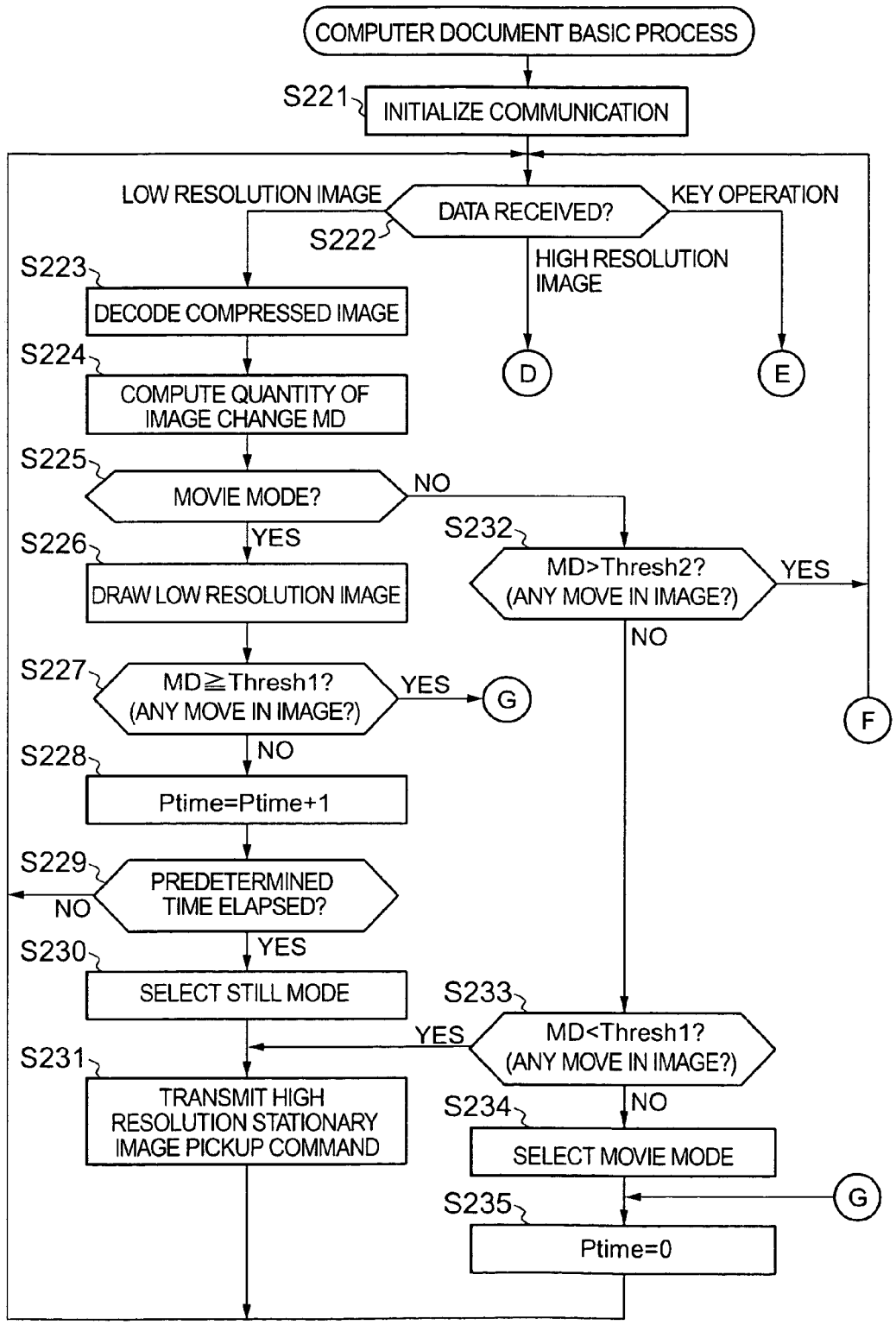
FIG. 36 is a former half of a flowchart of the basic document process to be executed by the computer in FIG. 33.

As the document processing software installed in the HDD 235 is started, the computer 5 executes the process for the functions of the document camera according to the flowchart of FIGS. 35 and 36.

Firstly, the CPU 236 initializes the functions such as communication (step S221).

Then, the CPU 236 determines if it receives data or not and then determines the contents of the received data (step S222).

If the received data is that of a low resolution image, the image processing apparatus 233 transforms the compressed data into uncompressed data by performing a compression-decoding operation on the compressed image (step S223).

Then, as in the case of Embodiment 1, the CPU 236 computes the quantity of image change MD by means of the equation 1 (step S224).

Then, the CPU 236 determines if it is the movie mode or the still mode that is selected for the imaging mode (step S225).

Since the movie mode is selected in the initial state, the CPU 236 determines that the movie mode is selected for the imaging mode (YES at step S225). Then, the CPU 236 draws the received low resolution image (step S226). The image processing apparatus 233 outputs the data of the drawn low resolution image to the projector 2 and the projector 2 projects the image onto the screen 3.

The CPU 236 determines the quantity of image change MD between the image and the image picked up last time by means of the equation 1 and compares the determined quantity of image change MD with the predefined threshold Thresh 1 so as to determine if there is a move in the image or not on the basis of the outcome of the comparison (step S227).

If it is determined that there is a move in the image (MD≧Thresh 1) (YES at step S227), the CPU 236 clears the stationary time Ptime (step S235) and continues the movie mode.

If, on the other hand, it is determined that there is not any move in the image (Thresh 1>MD) (NO at step S227), the CPU 236 adds 1 to the stationary time Ptime (step S228).

Then, the CPU 236 determines if the move is stopped and the predetermined period of time HoldTime has elapsed or not (step S229).

If it is determined that the predetermined period of time HoldTime has not elapsed yet (Ptime<HoldTime) (NO at step S229), the CPU 236 maintains the movie mode and waits for reception of the next data (step S222).

If, on the other hand, it is determined that the predetermined period of time HoldTime has elapsed (Ptime≧HoldTime) (YES at step S229), the CPU 236 selects the still mode for the imaging mode (step S230).

Then, the CPU 236 transmits an imaging command for picking up a high resolution still image (step S231) and waits for reception of stationary image data from the document camera 1 (step S222).

If data is received and it is determined that the received data is for a low resolution image (step S222), the CPU 236 decodes the low resolution image (step S223) and computes the quantity of image change MD (step S224). Then, it determines if the movie mode is selected for the imaging mode or not (step S224).

If it is determined that the still mode is selected for the imaging mode (NO at step S225), the CPU 236 determines if there is a move or not by comparing the quantity of image change MD with the two thresholds Thresh 1 and Thresh 2 (steps S232, S233) as in the case of Embodiment 1.

If MD<Threshold 1 (NO at step S232 and YES at step S233), the CPU 236 transmits an imaging command (step S231).

If Thresh 1≦MD≦Thresh 2 (NO at step S232 and NO at step S233), the CPU 236 holds the stationary image that is currently being displayed and also the movie mode for the imaging mode (step S234). Then, the CPU 236 resets the stationary time Ptime to 0 (step S235). Thereafter, the CPU 236 waits for reception of the next data (step S222).

If Thresh 2<MD (YES at step S232), the CPU 236 waits for reception of the next data, keeping the still mode (step S222).

Figure 37:
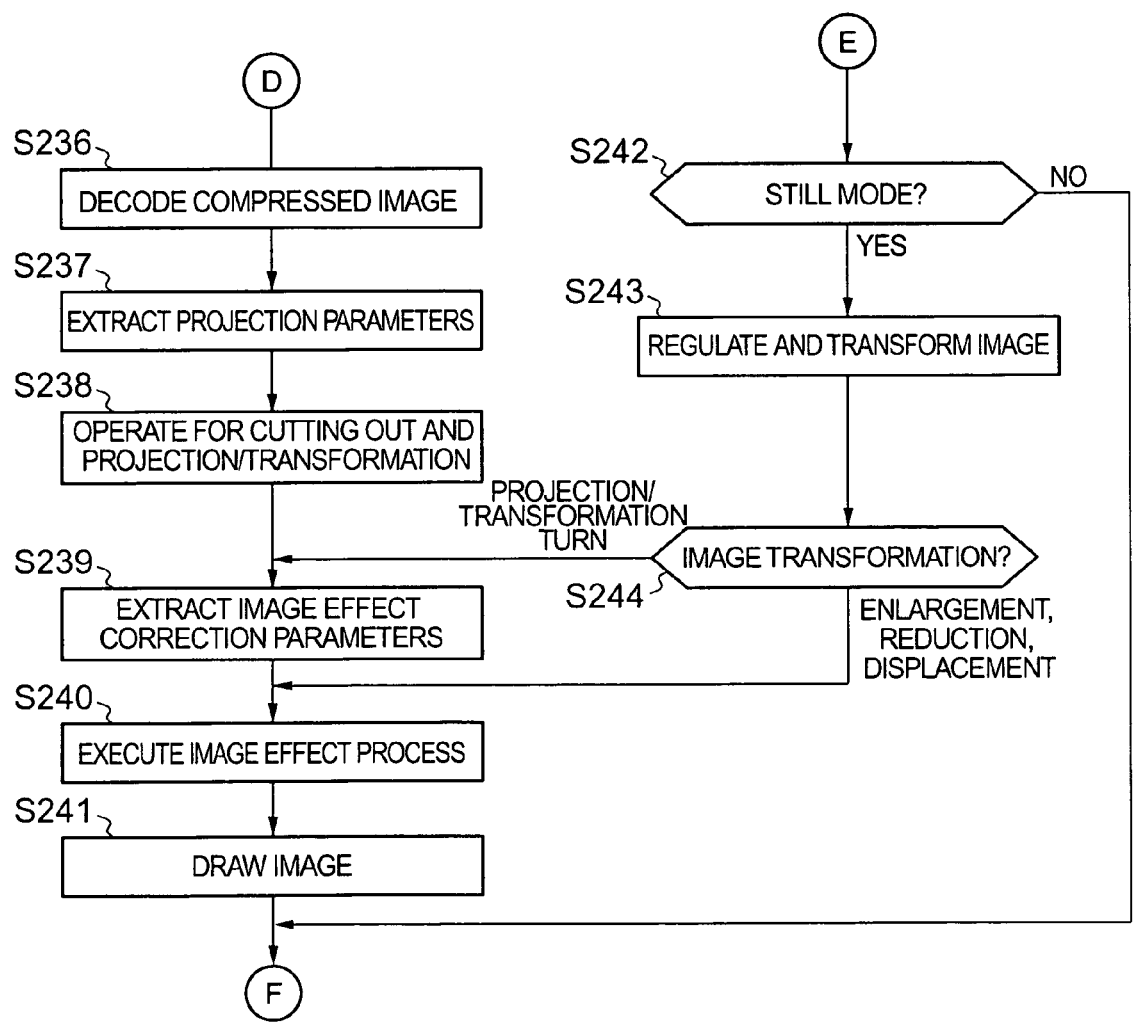
FIG. 37 is a latter half of a flowchart of the basic document process to be executed by the computer in FIG. 33.

If it is determined that the received data is for a high resolution image (step S222), the CPU 236 decodes the high resolution image (step S236 in FIG. 37).

The image processing apparatus 233 extracts projection parameters and executes an image effect process (steps S237 through S240) as in the case of Embodiment 1.

The image processing apparatus 233 draws the image and outputs it to the projector 2 (step S241) and the CPU 236 waits for reception of the next data (step S222).

If it is determined that the received data relates to information on key operation, the CPU 236 determines if the still mode is selected for the imaging mode or not and, if it is determined that the still mode is not selected (NO at step S242), it waits for reception of the next data (step S222).

If, on the other hand, it is determined that the still mode is selected (YES at step S242), the CPU 236 regulates and converts the image (step S243) and executes an image effect process that may vary depending on the specific current image conversion (steps S244, S239, S240) as in the case of Embodiment 1. The image processing apparatus 233 draws the image and outputs it to the projector 2 (step S241). Then, the CPU 236 waits for reception of the next data (step S222).

As described above, Embodiment 2 comprises a computer 5 that executes image processes. Therefore, it is not necessary to mount image processing hardware on the camera section 11 and hence it is possible to use a commercially available digital camera for the imaging/image projection apparatus. Thus, it is possible to provide the system at low cost.

The present invention may be embodied in various different ways. In other words, the present invention is by no means limited to the above-described embodiments.

For example, an image cutting out operation is conducted on the image acquired by transforming an image of the original 4 by means of projection parameters when extracting image effect correction parameters in Embodiment 1. However, it is also possible to extract image effect correction parameters from the real original section without projection transformation even if the image of the original 4 is distorted.

The original 4 is assumed to have a quadrangular shape and a quadrangle is acquired from the contour of the original 4 to perform various processes in the above-described embodiments. However, the shape of the original 4 is not limited to quadrangle and may be pentagon or the like, although such a shape may not be realistic.

An imaging apparatus is described as imaging/image projection apparatus for each of the above embodiments. However, an imaging apparatus according to the invention is not limited to such an imaging/image projection apparatus. For example, an imaging apparatus according to the invention may not necessarily comprise a projector 2. Either or both of the above-described embodiments may be so configured as to shoot an original 4 by means of a digital camera.

Programs are stored in a memory in advance in the above description of the embodiments. However, it may alternatively be so arranged that the programs for causing a computer to operate as all or part of the device or execute the above-described processes are stored in a computer-readable storage medium such as a flexible disk, CD-ROM (Compact Disk Read-Only Memory), DVD (Digital Versatile Disk), MO (Magneto-Optical disk) or the like, delivered and installed in a computer so that the computer may operate as the above-described various means or execute the above-described steps.

If the programs are stored in a disk device or the like of a server on the Internet, they may be downloaded to a computer by way of a carrier wave.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-354398 filed on Oct. 14, 2003 and including specification, claims, drawings and summary. The disclosure of the above Japanese Patent Application is incorporated herein by reference in its entirety.

What is claimed is:

1. An imaging apparatus for shooting an original, the apparatus comprising:
  a shape acquiring unit which acquires: (i) an image of the original that is obtained by shooting the original, (ii) a contour of the image of the original that is of an image representing the original within a shot image, and (iii) a shape of the image of the original based on the acquired contour;

a correction parameter acquiring unit which acquires image effect correction parameters for correcting an image effect based on only an area of the image of the original whose shape is acquired by the shape acquiring unit; and an image effect processing unit which performs an image effect process for the image of the original by using the image effect correction parameters acquired by the correction parameter acquiring unit, wherein the shape acquiring unit cuts out the image of the original at a specified timing subsequent to acquiring the shape of the image of the original.

2. The apparatus according to claim 1, wherein the correction parameter acquiring unit comprises a projection parameter acquiring unit which determines projection parameters indicating a relationship between the shape of the image of the original and an actual shape of the original based on the shape of the image of the original acquired by the shape acquiring unit; and wherein the correction parameter acquiring unit acquires the actual shape of the original from a projected transformed image that is obtained by projection/transformation using the projection parameters determined by the projection parameter acquiring unit and acquires the image effect correction parameters based on the image of the original having the actual shape of the image thus acquired.

3. The apparatus according to claim 2, wherein the projection parameter acquiring unit defines a three-dimensional (U, V, W) coordinate system in a space where a shooting target that is a quadrangle is found, arranges a projection plane on which the shooting target is projected in the space, defines an (X, Y, Z) coordinate system on the projection plane and acquires a projection/transformation equation formed by the projection parameters as shown by an equation 33 by establishing correspondence between a relation indicated by an equation 31 that is determined from relations defined by equations 29 and 30 and the projection/transformation equation of an equation 32, and wherein an image transforming unit transforms an image of the shooting target according to the projection/transformation equation of the equation 33, wherein:

$$P = S + m \cdot A + \cdot B \qquad \text{Equation 29}$$

where

P: coordinates (vector) of a predetermined point on the shooting target,

S: a distance (vector) between an origin of the (U, V, W) coordinate system and the shooting target, A, B: lengths (vector) of sides of an object of shooting, m: a coefficient of vector A, wherein $0 \leq m \leq 1$ n: a coefficient of vector B, wherein $0 \leq n \leq 1$ $$\begin{cases} Su = k1 \cdot x0 \\ Sv = k1 \cdot y0 \\ Sw = k1 \cdot f \end{cases} \qquad \text{Equation 30}$$

$$\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$$

$$\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$$

$$k1 = Sw/f$$

where

Su, Sv, Sw: a length of vector S in the three-dimensional coordinate system (U, V, W), Au, Av, Aw: a length of vector A, Bu, Bv, Bw: a length of vector B, f: a focal length of a lens of an imaging section, and α, β: coefficients that correspond to the vectors A and B respectively $$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases} \qquad \text{Equation 31}$$

$$\alpha = \frac{(x0 - x1 + x2 - x3) \cdot (y3 - y2) - (x3 - x2) \cdot (y0 - y1 + y2 - y3)}{(x1 - x2) \cdot (y3 - y2) - (x3 - x2)(y1 - y2)}$$

$$\beta = \frac{(x1 - x2) \cdot (y0 - y1 + y2 - y3) - (x0 - x1 + x2 - x3) \cdot (y1 - y2)}{(x1 - x2) \cdot (y3 - y2) - (x3 - x2)(y1 - y2)}$$

where x, y: coordinates of each point of an image of the object of shooting on the projection plane, and x0, x1, x2, x3, y0, y1, y2, y3: coordinate values indicating positions of corners (x0, y0), (x1, y1), (x2, y2) and (x3, y3) of the image of the shooting target as projected on the projection plane $$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \qquad \text{Equation 32}$$

where x' y', z': coordinates of each point on the image of the shooting target on the projection plane, and x0, x1, x2, x3, y0, y1, y2, y3: the coordinate values indicating the positions of the corners (x0, y0), (x1, y1), (x2, y2) and (x3, y3) of the image of the shooting target as projected on the projection plane $$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix} \qquad \text{Equation 33}$$

4. The apparatus according to claim 2, wherein the correction parameter acquiring unit: (i) generates a luminance histogram showing a relationship between a luminance value of the image of the original having the acquired actual shape and a number of pixels having the luminance value, and (ii) acquires parameters for correcting the luminance histogram as the image effect correction parameters from the generated luminance histogram.

5. The apparatus according to claim 2, wherein the correction parameter acquiring unit: (i) generates a color difference histogram showing a relationship between a color difference of the image of the original having the acquired actual shape and a number of pixels having the color difference, and (ii)

acquires parameters for correcting the color difference histogram as the image effect correction parameters from the generated color difference histogram.

6. The apparatus according to claim 5, wherein the image effect processing unit acquires the color difference having a largest number of pixels as an image effect correction parameter from the generated color difference histogram and regulates a color of the image of the original in the image effect process.

7. The apparatus according to claim 2, further comprising a projecting section which is configured to project an image onto a screen, wherein projection correction and image effect correction have been performed for the projected image.

8. The apparatus according to claim 1, wherein the shape acquiring unit comprises:
   an edge image detecting unit which detects an edge image of the image of the original; and
   a straight line detecting unit which detects straight lines that form candidates for the contour of the original from the edge image detected by the edge image detecting unit; and
   wherein the shape acquiring unit acquires the contour of the original by combining the straight lines detected by the straight line detecting unit.

9. The apparatus according to claim 8, wherein the shape acquiring unit acquires a shape having a largest area as the shape of the image of the original out of plural shapes formed by combining the straight lines detected by the straight line detecting unit.

10. The apparatus according to claim 1, wherein the image effect processing unit acquires command information on the image effect process and executes the image effect process according to the acquired command information.

11. The apparatus according to claim 1, further comprising: an imaging section which is supported on a support pillar and which is adapted to pick up the image of the original.

12. The apparatus according to claim 1, wherein the image effect processing unit uses the image effect correction parameters to perform the image effect process only for the area of the image of the original.

* * * * *